(12) United States Patent
Chan

(10) Patent No.: US 6,920,454 B1
(45) Date of Patent: Jul. 19, 2005

(54) TECHNIQUES FOR DLM OPTIMIZATION WITH TRANSFERRING LOCK INFORMATION

(75) Inventor: Wilson Wai Shun Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/493,673

(22) Filed: Jan. 28, 2000

(51) Int. Cl.[7] .............................................. G06F 17/30
(52) U.S. Cl. .............................. 707/8; 707/10; 707/6; 707/100
(58) Field of Search ........................... 707/10, 3, 8, 6, 707/100; 709/200–204

(56) References Cited

U.S. PATENT DOCUMENTS

| | | | |
|---|---|---|---|
| 5,060,144 A | 10/1991 | Sipple et al. ............... | 395/726 |
| 5,161,227 A | 11/1992 | Dias et al. .................. | 395/650 |
| 5,202,971 A | 4/1993 | Henson et al. ................ | 707/8 |
| 5,287,521 A | 2/1994 | Nitta et al. | |
| 5,403,639 A | 4/1995 | Belsan et al. ............... | 395/600 |
| 5,408,653 A | 4/1995 | Josten et al. .................... | 707/8 |
| 5,452,447 A | 9/1995 | Nelson et al. ............. | 707/205 |
| 5,551,046 A | 8/1996 | Mohan et al. ................. | 707/8 |
| 5,612,865 A | 3/1997 | Dasgupta | |
| 5,892,945 A | 4/1999 | Mirchandaney et al. .... | 395/674 |
| 5,893,086 A | 4/1999 | Schmuck et al. ............. | 707/1 |
| 5,963,960 A | 10/1999 | Swart et al. ................ | 707/202 |
| 5,963,963 A | 10/1999 | Schmuck et al. | |
| 5,970,495 A | 10/1999 | Baru et al. .................. | 707/102 |
| 5,999,712 A | * 12/1999 | Moiin et al. ................ | 709/203 |
| 6,023,706 A | 2/2000 | Schmuck et al. ........... | 707/200 |
| 6,026,293 A | 2/2000 | Osborn ....................... | 455/411 |
| 6,026,394 A | 2/2000 | Tsuchida et al. | |
| 6,044,367 A | 3/2000 | Wolff | |
| 6,047,283 A | 4/2000 | Braun | |
| 6,052,697 A | 4/2000 | Bennett et al. | |
| 6,101,495 A | 8/2000 | Tsuchida et al. | |

(Continued)

OTHER PUBLICATIONS

Hauptmann S., Wasel J.: "On–Line Maintenance with On–the–Fly Software Replacement," Proceedings of the Third International Conference on Configurable Distributed Systems, Annapolis, MD. May 6–8 1996, IEEE Computer Society Press, Los Alamitos, CA, p. 70–80, XP002134719.
Loomis, Mary E.S., ODBMS, "Object Locking", Mar./Apr. 1992, pp. 53–56.
Apple Computer, Inc., Apple Press, "OpenDoc Cookbook for the Mac OS", 1996, pp. 187–189.
Aldred, M., Gertner, I., McKellars, S., Encore Comput. Corp., Marlborough, MA, "A Distributed Lock Manager on Fault Tolerant MPP", 1995, pp. 134–136.
CORBAservices, "CORBAservices: Common Object Services Specification", Mar. 1995, pp. 7–1 to 7–14.
Mirchandaney, R., "Improving the Performance of DSM Systems via Compiler Involvement", Supercomputing '94, Proceedings, pp. 763–772.

*Primary Examiner*—Shahid Alam
*Assistant Examiner*—Cam Y. Truong
(74) *Attorney, Agent, or Firm*—Christian A. Nicholes; Hickman Palermo Truong & Becker LLP

(57) ABSTRACT

Techniques for optimizing a distributed lock manager (DLM) include transferring lock information to a new master without freezing one or more shared resources. A hash value range is associated with the resources by a hash function. A first master node is established as master for the resources in response to a hash value range being mapped to the first master node. Responsibility for mastering the resources is transferred from the first master node to a second master node during a transfer time interval. Lock requests received at a receiving node, either the first master node or the second master node, are processed by the receiving node during the transfer time interval.

19 Claims, 15 Drawing Sheets

U.S. PATENT DOCUMENTS

| | | | |
|---|---|---|---|
| 6,144,983 A | 11/2000 | Klots et al. | 709/104 |
| 6,173,313 B1 | 1/2001 | Klots et al. | 709/203 |
| 6,185,601 B1 * | 2/2001 | Wolff | 709/203 |
| 6,209,074 B1 | 3/2001 | Dell et al. | |
| 6,292,795 B1 | 9/2001 | Peters et al. | 707/3 |
| 6,363,396 B1 | 3/2002 | Klots et al. | 707/103 |
| 6,401,110 B1 * | 6/2002 | Freitas et al. | 709/104 |
| 6,449,699 B2 | 9/2002 | Franke et al. | |
| 6,449,734 B1 * | 9/2002 | Shrivastava et al. | 714/15 |

* cited by examiner

| Hash Value Range | Master Node | |
|---|---|---|
| 0-9 | 202 | ← 401 |
| 10-19 | 212 | ← 402 |
| 20-29 | 222 | ← 403 |
| 30-39 | 232 | ← 404 |
| 40-49 | 202 | ← 405 |
| 50-59 | 212 | ← 406 |
| 60-69 | 222 | ← 407 |
| 70-79 | 232 | ← 408 |
| 80-89 | 202 | ← 409 |
| 90-99 | 212 | ← 410 |
| 100-109 | 222 | ← 411 |
| 110-119 | 232 | ← 412 |

492 → Hash Value Range; 494 → Master Node; 303

| Master Node | Hash Value Ranges | |
|---|---|---|
| 202 | 0-9,40-49,80-89, ... | ← 421 |
| 212 | 10-19,50-59,90-99, ... | ← 422 |
| 222 | 20-29,60-69,100-109, ... | ← 423 |
| 232 | 30-39,70-79,110-119, ... | ← 424 |

494' points to Master Node column; 492' points to Hash Value Ranges column.

| Actual Node | Weight | |
|---|---|---|
| 202 | -1 | ← 501 |
| 212 | 0 | ← 502 |
| 222 | 2 | ← 503 |
| 232 | 1 | ← 504 |
| Node E | 4 | ← 505 |
| Node F | 1 | ← 506 |
| Node G | 0 | ← 507 |
| Node H | -1 | ← 508 |

592 points to Actual Node column; 594 points to Weight column.

FIG. 5

|  | 692 | 694 | 696 | 698 | |
|---|---|---|---|---|---|
| Hash Value Range | Node 202 | Node 212 | Node 222 | ··· | 305 |
| 0-9 | 10 | 10 | 0 | ← 601 |
| 10-19 | 0 | 1 | 5 | ← 602 |
| 20-29 | 2 | 5 | 1 | ← 603 |
| 30-39 | 100 | 10 | 2 | ← 604 |
| 40-49 | 0 | 0 | 1 | ← 605 |
| 50-59 | 1 | 0 | 1 | ← 606 |
| 60-69 | 100 | 100 | 1 | ← 607 |
| 70-79 | 30 | 30 | 0 | ← 608 |
| 80-89 | 0 | 0 | 0 | ← 609 |
| 90-99 | 0 | 0 | 0 | ← 610 |
| 100-109 | 0 | 0 | 0 | ← 611 |
| 110-119 | 0 | 0 | 0 | ← 612 |

FIG. 6

TECHNIQUES FOR DLM OPTIMIZATION WITH TRANSFERRING LOCK INFORMATION

CROSS REFERENCE TO RELATED APPLICATIONS

This application is related to U.S. patent application Ser. No. 09/493,660 filed on Jan. 28, 2000, entitled TECHNIQUES FOR DLM OPTIMIZATION WITH RE-MAPPING RESPONSIBILITY FOR LOCK MANAGEMENT, by inventor Wilson Wai Shun Chan; and to U.S. patent application Ser. No. 09/493,659 filed on Jan. 28, 2000 entitled TECHNIQUES FOR DLM OPTIMIZATION WITH RE-MASTERING EVENTS, by inventor Wilson Wai Shun Chan.

FIELD OF THE INVENTION

The present invention relates to managing overlapping requests for resources on a computer system using locks, and more particularly to techniques to speed reconfiguration of locks among nodes of a distributed lock manager (DLM).

BACKGROUND OF THE INVENTION

Computer systems are used to process data and control devices. A computer system resource is a portion of memory or a device utilized by the computer system. When several processes running simultaneously on a computer system share a resource there may be contention for that shared resource during overlapping periods of time. In such a situation a computer system management process must accumulate requests for the resource and grant them as the resource becomes available to the requesting processes. Consequently, mechanisms have been developed which control access to resources.

For example, database servers are processes that use resources while executing database transactions. Even though resources may be shared between database servers, many resources may not be accessed in certain ways by more than one process at any given time. More specifically, resources such as data blocks of a storage medium or tables stored on a storage medium may be concurrently accessed in some ways (e.g. read) by multiple processes, but accessed in other ways (e.g. written to) by only one process at a time.

One mechanism for controlling access to resources is referred to as a lock. A lock is a data structure that indicates that a particular process has been granted certain rights with respect to a resource. There are many types of locks. Some types of locks may be shared on the same resource by many processes; while other types of locks prevent any other locks from being granted on the same resource.

The entity responsible for granting locks on resources is referred to as a lock manager. In a single node computer system, a lock manager will typically consist of one or more processes on the node. In a multiple-node system, such as a multi-processing machine or a local area network, a lock manager may include processes distributed over numerous nodes. A lock manager that includes components that reside on two or more nodes is referred to as a distributed lock manager (DLM).

FIG. 1 is a block diagram of a computer system 100. A computer system 100 typically includes at least one processor 104, an internal communications bus 1023 sand a fast but volatile main memory 106. More permanent storage is provided by a read only memory (ROM) 108 sand one or more non-volatile storage devices 110. In modern distributed computer systems, the computer system 100 is connected via a network link 120 to a local network 122 and one or more other computer systems such as host 124. The computer system can also be connected to the internet 128 either directly or through an internet service provider (ISP) 126. Over the internet, the computer system 100 can communicate with one or more other computer systems such as server 130.

FIG. 2 is a block diagram of a multiple-node computer system 200 which utilizes a conventional distributed lock manager for a distributed database. Each node has stored therein a database server and a portion of a distributed lock management system 296. Specifically, the illustrated system includes four nodes 202, 212, 222 and 232 on which reside database servers 204, 214, 224 and 234, respectively, and lock manager units 206, 216, 226 and 236, respectively. Database servers 204, 214, 224 and 234 have access to the same database 260. The database 260 resides on a disk 250 that contains multiple blocks of data. Disk 250 generally represents one or more persistent storage devices which may be on any number of machines, including but not limited to the machines that contain nodes 202, 212, 222 and 232.

A communication mechanism 270 allows processes on nodes 202, 212, and 222 to communicate with each other and with the disks that contain portions of database 260. The specific communication mechanism 270 between the nodes and disk 250 will vary based on the nature of system 200. For example, if the nodes 202, 212, 222 and 232 correspond to workstations on a network, the communication mechanism 270 will be different than if the nodes 202, 212, 222 and 232 correspond to clusters of processors and memory within a multi-processing machine.

Before any of database servers 204, 214, 224 and 234 can access a resource shared with the other database servers, it must obtain the appropriate lock on the resource from the distributed lock management system 296. The resource may be part of the database, like resource 261 which may be, for example, one or more blocks of disk 250 on which data from database 260 is stored. The resource may be on a particular piece of equipment 270. For example, the device resource 271 may be a print buffer on a printer or a scan register on a scanner.

Distributed lock management system 296 stores data structures, herein called resource locking objects (RLO), such as master RLO 208 and shadow RLO 209 on node 202, that indicate the locks held by database servers 204, 214, 224 and 234 on the resources shared by the database servers. If one database server requests a lock on a resource while another database server has a lock on the resource, the distributed lock management system 296 must determine whether the requested lock is consistent with the granted lock, i.e., can be granted simultaneously with the lock already granted, as in the case of two read locks on a block of storage currently residing in memory. If the requested lock is not consistent with the granted lock, such as when both are exclusive locks for the same resource, as is typical during writes to a database, then the requester must wait until the database server holding the granted lock releases the granted lock.

According to one conventional approach, a lock management system 296 includes one lock manager unit for each node that contains a database server and maintains one master resource locking object (RLO) for every resource managed by the lock management system 296. The master RLO for a particular resource stores, among other things, an indication of all locks that have been granted on or requested for the particular resource. The master RLO for each resource resides with only one of the lock manager units 206, 216, 226 and 236. For example, the master RLO for resource 261 resides with only one of the lock manager units, such as master RLO 238 residing with lock manager unit 236.

A node is referred to as the "master node" (or simply "master") of the resources whose master RLOs are managed by the lock manager unit that resides on the node. In the above example, the master RLO 238 for resource 261 is managed by lock manager unit 236, so node 232 is the master of resource 261.

In typical systems, a hash function is employed to randomly select the particular node that acts as the master node for a given resource. For example, system 200 includes four nodes, and therefore may employ a hash function that produces four values: 0, 1, 2 and 3, or four ranges of values 0–5, 6–10, 11–15 and 16–20. Each value, or range, is associated with one of the four nodes. The node that will serve as the master for a particular resource in system 200 is determined by applying the hash function to the name of the resource. For example, using the hash value ranges, all resources that have names that hash to 0–5 are mastered on node 202; all resources that have names that hash to 6–10 are mastered on node 212; etc. In this example, the resource name of resource 261 supplied as input to a hash function produces a value, e.g., 17, in the range 16–20 and is thus mastered on node 232.

When a process on a node attempts to access a resource the same hash function is applied to the name of the resource to determine the master of the resource, and a lock request is sent to the master node for that resource. The lock manager unit on the master node for the resource controls the allocation and release (or "de-allocation") of locks for the associated resource. The hashing technique described above tends to distribute the resource mastering responsibility evenly among existing nodes.

In networked computer systems, some or all of the processes that are holding and requesting locks on a particular resource may be on different nodes than the master node that contains the resource locking object that corresponds to the resource. For example, the process desiring a lock and the lock resource may reside within different nodes of a multi-processor machine, or on different workstations in a local area network. Consequently, all of the messages that pass between the lock-requesting processes and the lock manager unit must be transmitted between nodes over the network. The computational power that must be expended to facilitate such inter-node messages is significant relative to the power required for intra-node communication. In addition, inter-node communication is generally slower than intra-node communication. Further, the inter-node traffic thus generated reduces the throughput available for other types of inter-node traffic, which reduction may be significant when the inter-node traffic is between workstations on a network.

In a related patent application, U.S. Ser. No. 08/669,689, DLM message traffic between nodes is reduced by introducing shadow RLOs 209, 219, 229 and 239 on the four nodes, 202, 212, 222 and 232, respectively. One or more shadow RLOs for any given resource may be spread over one or more nodes, effectively turning the master resource locking object (MRLO) into a distributed locking object. For example, resource 261, which has a master RLO 236 on node 232, has shadow SLOs 209, 219, and 229 on nodes 202, 212 and 222, respectively, to handle lock requests for resource 261 by the corresponding database servers on those same nodes. Each of the nodes that has a shadow RLO may be used to perform lock operations at that node related to the resource associated with the shadow RLO. For example, node 202 can be used to perform lock operations on node 202 related to resource 261 using shadow RLO 209, even though the master RLO for resource 261 is master RLO 238 on node 232. The Shadow RLO must communicate with the master RLO over the communication mechanism 270, but this can be conveyed according to the above patent application to minimize traffic. Besides reducing message traffic among nodes, by distributing the processing load required to perform lock management for the resource among the several shadow RLOs, this processing load is less likely to overburden the master node than in lock management systems in which all lock operations for a resource must be performed at the single master node. Without shadow RLOs, the master of several popular resources can be overburdened.

If a node leaves the system, the system is reconfigured to reflect the current cluster of available active nodes. However, the hash function assigning resources to master nodes becomes obsolete when the number of nodes changes. For example, if node 232 leaves the system, resources that hash to the hash value range 16–20 have no node available to serve as master. In a conventional process called "conventional re-mastering," a new hash function is employed which maps resource name to master node using only the available nodes, and all global resource information from all the nodes that still have open locks for the resources mastered by the departing nodes must be transmitted to the new master or masters. The DLM process of changing the resource-to-master node assignments is herein referred to as "re-mapping." The DLM process including both the re-mapping and the resulting message traffic transferring lock information is referred to herein as "re-mastering." The process of removing nodes from the system is referred to herein as "reconfiguring" the system; and it involves many steps in addition to re-mastering by the DLM.

While the conventional DLM systems described above have advantages, they still have some significant drawbacks. For example, the message traffic associated with sending all global information for all resources with open locks to the new masters can significantly impair system performance. Experience with conventional re-mastering shows that it can occupy more than fifty percent of the total DLM reconfiguration time.

As an additional disadvantage, to ensure that locks are properly granted, the conventional system suspends all lock operations during reconfiguration until all resources have new masters assigned. The suspension of lock operations temporarily halts some database functions and adversely affects database performance. The suspension of lock operations is called herein "freezing" lock requests.

Another disadvantage of the conventional system is that hash functions tend to distribute mastering tasks evenly over available nodes, but other considerations may make a non-uniform distribution of master RLO across the nodes optimal. The conventional system does not provide a means to achieve the non-uniform optimal distribution of master RLOs.

As one example of non-uniform but optimal distribution of master RLOs, one node may be used as standby to act when another node goes down; such a node should not serve as a master until the other node fails. As another example, one node may have more processing power than other nodes and can handle more master RLOs than the other nodes. In still another example, one node may experience better performance when serving as a master node than another node serving as master for particular resources. The first node is said to have lock affinity for those particular resources.

As another example of non-uniform but optimal distribution of master RLOs, a node may actually open more locks than expected from an even distribution of locks. Such excessive use of open locks may put the node in danger of exceeding the memory originally allocated for the RLOs. As a master node of a resource, the node needs to allocate one RLO and a number, M+N, of lock structures associated with the RLO, where N is the number of local locks and M is the number of other nodes which have open locks on the resource. For example, if node 232 is the master of resource 261, node 232 must allocate memory for one Master RLO for resource 261; and, if node 232 has 5 locks on resource 261 and if all the other nodes have open locks on resource 261, then node 232 must also allocate memory for 8 open locks. If another node is made new master of this resource, this old master node can free the memory used by M lock structures. In the above example, the node can free the memory consumed by 3 lock structures.

If a node joins the system, the conventional system is not automatically reconfigured to reflect the additional available nodes. The problem with this arrangement is that masters tend to accumulate on the original nodes and the full benefits of distributed processing are not achieved. When the system is eventually reconfigured, for example when one of the original nodes goes down, a great deal of message traffic must be passed to move data from the old master RLOs to the new masters RLOs on both the added nodes and the original nodes, further degrading performance during reconfiguration.

What is needed is an improved DLM which can be reconfigured more quickly and flexibly than reconfiguration using the conventional DML and without freezing all lock requests.

SUMMARY OF THE INVENTION

Techniques for improving distributed lock manager (DLM) performance and decreasing the time required for reconfiguration include transferring lock information to a new master without freezing one or more shared resources.

According to one technique, a hash value range is associated with the resources by a hash function. A first master node is established as master for the resources in response to a hash value range being mapped to the first master node. Responsibility for mastering the resources is transferred from the first master node to a second master node during a transfer time interval. Lock requests received at a receiving node, either the first master node or the second master node, are processed by the receiving node during the transfer time interval.

According to another aspect of the invention, a computer-readable medium bears instructions for re-distributing, over a cluster of one or more active nodes, management of locks on shared resources from a first master node to a second master node during a transfer time interval. A hash value range is associated with one or more of the shared resources by a hash function. The first master node re-maps a hash value range initially assigned to the first master node to the second master node. Initial lock information resident on the first master node at a start of the transfer time interval is sent to the second master node. The first master node then receives acknowledgments from other active nodes in the cluster; indicating that the other active nodes have been informed that the second master node is assuming responsibility for mastering the one or more resources.

According to another aspect of the invention, a computer-readable medium bears instructions for re-distributing, over a cluster of one or more active nodes, management of locks on shared resources from a first master node to a second master node during a transfer time interval. A hash value range is associated with one or more of the shared resources by a hash function. The second master node receives initial lock information resident on the first master node at a start of the transfer time interval. A hash value range initially assigned to the first master node is re-mapped to the second master node. The second master node then sends a broadcast message to all other nodes in the cluster that the second master node is a new master node for resources associated with the hash value range.

According to another aspect of the invention, a computer-readable medium bears instructions for re-distributing, over a cluster of one or more active nodes, management of locks on shared resources from a first master node to a second master node during a transfer time interval. A hash value range is associated with one or more of the shared resources by a hash function. A third node receives a broadcast message indicating that the second master node is a new master node for resources associated with a hash value range. The third node re-maps the hash value range to the second master node; and sends an acknowledgment to the first master node in response to the broadcast message. The acknowledgement indicates that the third node has been informed that the second master node is assuming responsibility for mastering the one or more resources. The third node then sends subsequent lock requests for the shared resources to the second master node.

BRIEF DESCRIPTION OF THE DRAWINGS

The present invention is illustrated by way of example, and not by way of limitation, in the figures of the accompanying drawings and in which like reference numerals refer to similar elements and in which:

The present invention is illustrated by way of example, and not by way of limitation, FIG. 4A is a block diagram of a data structure for a map of hash value ranges to master nodes.

FIG. 4B is a block diagram of a data structure for a map of hash value ranges to master nodes.

FIG. 5 is a block diagram of a data structure for a master weight table according to one embodiment of the present invention.

FIG. 6 is a block diagram of a data structure for an open resources/locks table according to alternative embodiments of the present invention.

DETAILED DESCRIPTION OF THE PREFERRED EMBODIMENT

Techniques for DLM optimization and faster reconfiguration are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

Certain techniques described below are directed to flexibly re-mastering without freezing lock operations. This improves performance of a DLM by avoiding the suspension of all lock operations during re-mastering.

Other techniques allow re-mastering without performing the other functions of reconfiguration. This speeds subsequent reconfiguration, on average, by anticipating some of the message traffic that would be needed during the next reconfiguration, and causing the messages to be communicated at earlier times, typically when system computational power is not heavily taxed, before the next reconfiguration.

Still other techniques establish new mappings between resources and master nodes. The techniques implement a flexible mastering policy while reducing either the message traffic required to accomplish the re-mastering, or the lock message traffic between nodes during normal DLM operations after the re-mastering, or both. This speeds re-mastering by minimizing the message traffic during re-mastering. This speeds reconfiguration by speeding the re-mastering performed during reconfiguration. This also improves DLM performance by allowing the flexible policy for distributing master RLOs among the available nodes and by reducing the number of messages between nodes during normal DLM operations.

Hardware Overview

Figure 1:
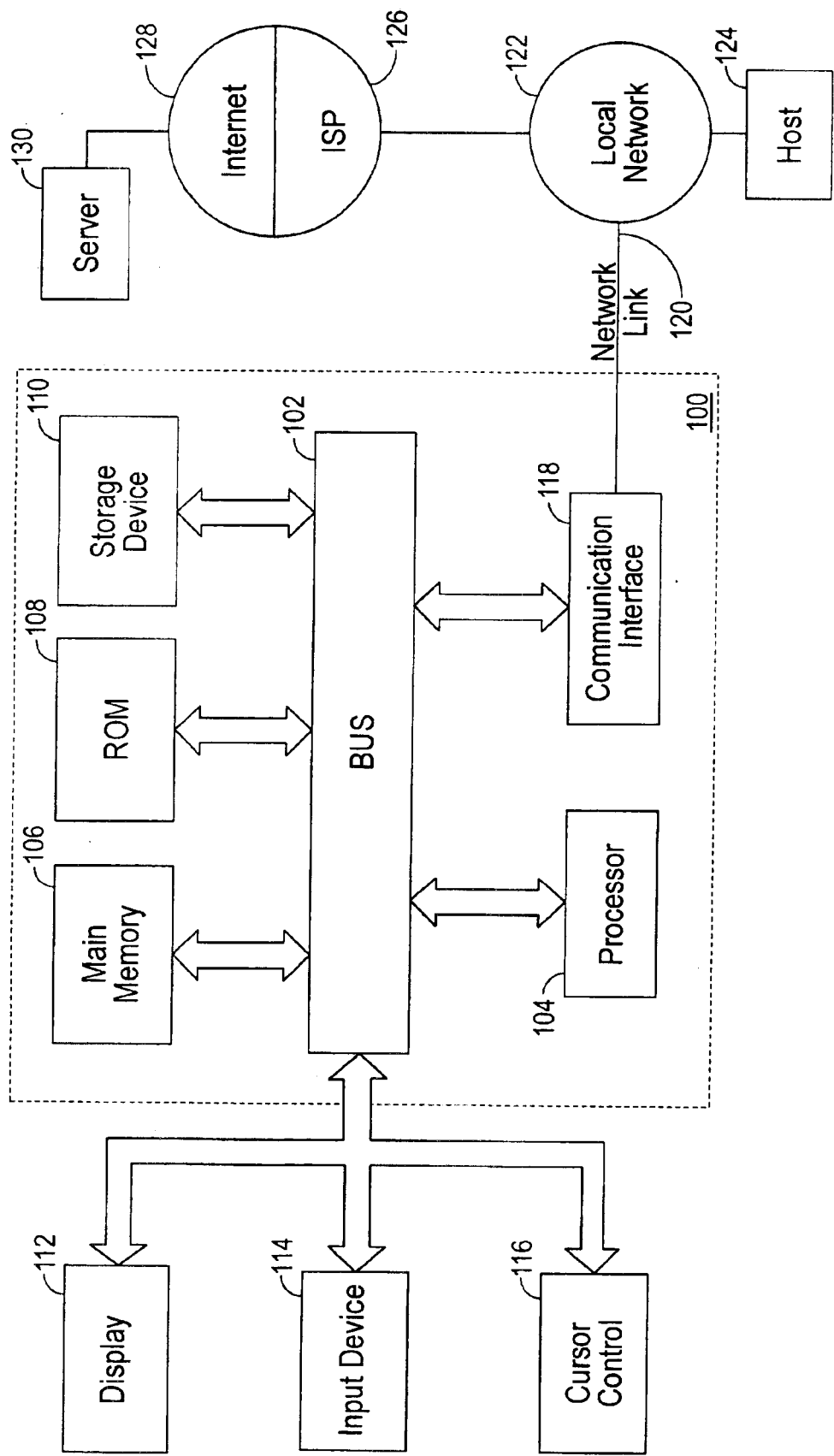
FIG. 1 is a block diagram of a computer system capable of supporting an embodiment of the present invention.

FIG. 1 is a block diagram that illustrates a computer system 100 upon which an embodiment of the invention may be implemented. Computer system 100 includes a bus 102 or other communication mechanism 270 for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for distributed lock management. According to one embodiment of the invention, re-mastering is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modern. A modern local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modern to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for distributed lock management as described herein.

The received code may be executed by processor 104 as it is received, and/or stored in storage device 110, or other non-volatile storage for later execution. In this manner, computer system 100 may obtain application code in the form of a carrier wave.

The Master Resource Locking Object

The master RLO, or MRLO, for each resource contains global resource information such as the resource name, the number of opened locks, the granted lock mode (shared or exclusive), a list of locks currently granted and a list of lock requests on a convert queue. This information is used for lock conversion (changing requests to grants, changing one form of granted lock to another, and changing grants to releases) and also for recovery. Recovery refers to a process that corrects a database, when the database server cannot complete a transaction of interdependent data manipulation operations, by returning the database to its state before the transaction began.

When a node is removed from the cluster of active nodes that make up the distributed DLM system, the information in each master RLO that was on that node must be transferred to a new master node and installed in a master RLO for that resource on the new node. This information is transferred in a series of one or more messages. A given resource has only one master RLO.

The Shadow Resource Locking Object

While there is only one master RLO for a given resource, there may be many shadow RLOs for that same resource. The shadow RLO contains lock information pertaining to that given resource associated with all processes on the node where the shadow RLO resides. There is only one shadow RLO on a given node for a given resource. The shadow RLO for each resource contains local resource information such as the resource name, the number of opened locks for that resource owned by processes on the local node, a list of local locks currently granted and a list of local lock requests on a convert queue. This information is used to manage locks on the resource granted to the node in general. This allows locks to be granted and exchanged among processes on the same node without incurring message traffic to the master node that can burden communication channels.

The Hash Map

In the conventional DLM, resource master nodes are distributed among all active nodes in the cluster through a hash function which distributes resources evenly among the active nodes. The hash function depends on the number of active nodes in the cluster, so that as nodes transition into and out of the cluster, different hash functions have to be used. Thus, after nodes transition into or out of the cluster, a new count of active nodes has to be made and a new function applied that provides a number of hash values that corresponds to the number of active nodes.

Instead of using a different hash function for each different number of active nodes in the cluster, a hash function is used which produces a number, M, of hash values that is greater than the number of active nodes. These M values are mapped to some or all of the current nodes in the cluster of active nodes using a "hash map". A hash map associates a hash value with a node that will serve as the master for resources associated with that hash value.

According to a related application (U.S. patent application Ser. No. 09/218,864 entitled OBJECT HASHING WITH INCREMENTAL CHANGES filed Dec. 21, 1998), M is an integer multiple of the maximum number, N, of nodes allowed in a cluster (which may be specified in a system parameter). Consequently, no matter how many nodes (up to N) are in the cluster, there are several hash values that will be associated with each node. As shall be described in greater detail hereafter, the same M-way hash function can be used regardless of the number of active nodes in the cluster. Thus, only the hash map must be changed in response to changes in the number of nodes within the cluster.

In general, the hash map can associate a range of hash values with each node in lieu of a single hash value. A node to which a single hash value is mapped is thus a special case of a hash value range, where the first and last values in the range are the same. In the general case, when nodes transition into and out of the cluster of active nodes, only the hash map needs to be revised. During the hash map revision, herein called "re-mapping," hash value ranges that are associated with nodes that have been removed from the cluster are remapped to nodes that remain in the cluster. For resources associated with hash values that belong to ranges that have been remapped, the lock information already constructed in the master RLOs on the old nodes is then transferred to the new master nodes. The entire set of master and shadow RLOs do not have to be rebuilt from the resources and the hash function, as in the conventional DLM.

Furthermore, not all the hash value ranges in the hash map are associated with mappings that have to be revised. Only resources having a hash value in a hash value range mapped to a node which is leaving the cluster (a "terminating" node) have to be re-mapped and have their master information transferred, in one embodiment.

Let R represent all open resources, and n represent the number of active nodes in the cluster after the terminating node leaves. According to the techniques of the above mentioned application (Ser. No. 09/218,864), the average number of resources which need to be re-mapped and have their lock information transferred is given by the quantity R÷(n+1). Using the conventional system, all R resources need to have their lock information distributed to new master nodes. Thus, this technique reduces the load of configuring the DLM after a node leaves by a factor of n+1.

In the technique of the above mentioned application (Ser. No. 09/218,864), each of the n surviving nodes will be assigned as the master node for a equal portion of the resources that need new masters. This share is given by the quantity R÷(n(n+1)). Assuming one message can hold the lock information for one resource being moved from an old master node to a new master node, the total number of messages required is given by the quantity R(n−1)/(n(n+1)). This message traffic is substantially less than the messages required with the conventional system given by the quantity R(n−1)/n.

Another advantage of having a constant hash value for each resource and a hash map associating a hash value range with a particular node, is that the data maintained by the DML can have a recovery domain defined for each hash value range instead of for the entire collection of master RLOs distributed across the whole cluster of active nodes. Recovery domains are described in U.S. patent application Ser. No. 08/672,348, filed on Jun. 25, 1996, entitled RESOURCE MANAGEMENT USING RESOURCE DOMAINS, by Patricia Grewell, Terry N. Hayes, William Bridge, and Hans Karten.

Figure 2:
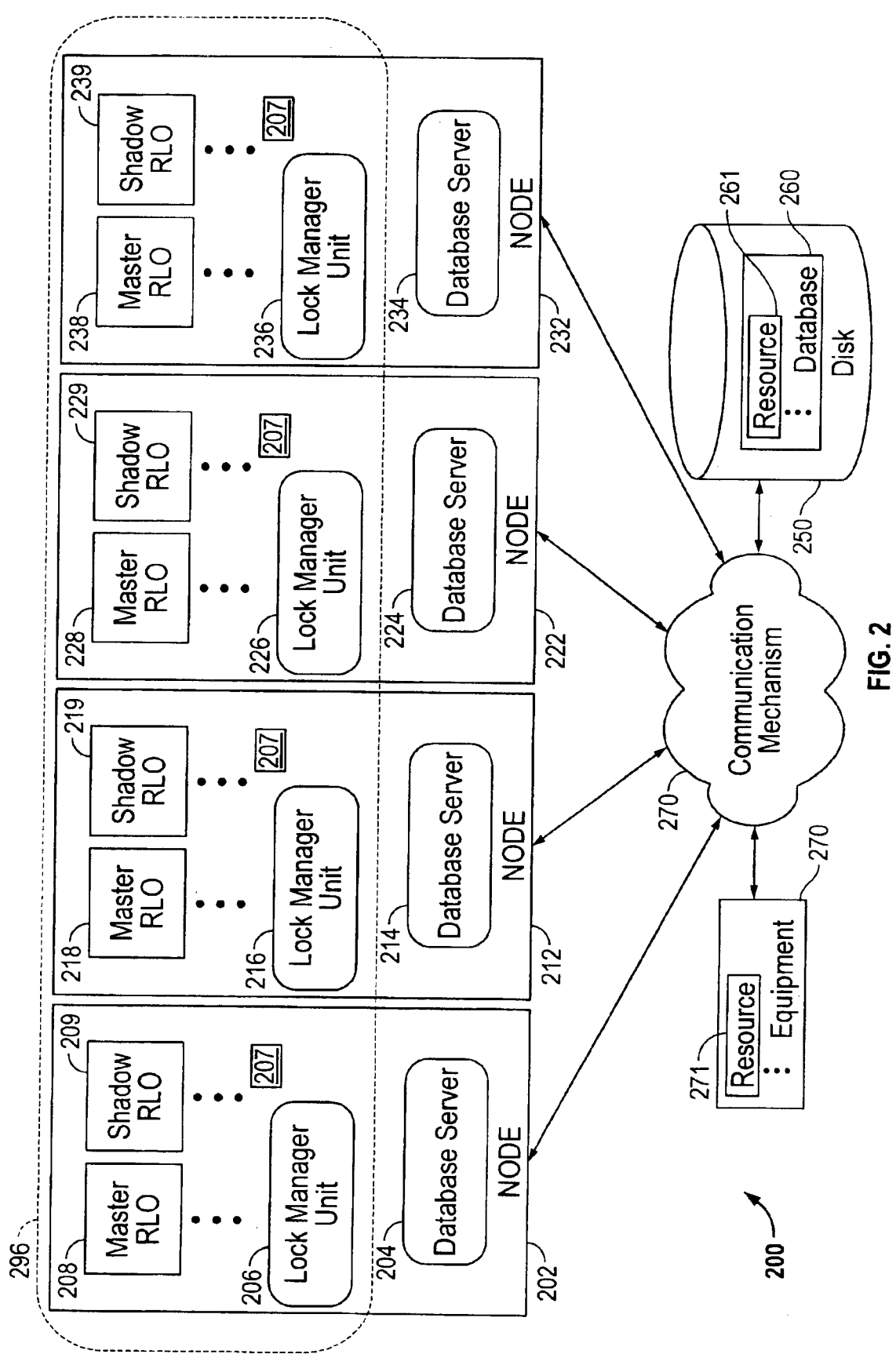
FIG. 2 is a block diagram of a conventional distributed lock manager for a distributed database.
Figure 3:
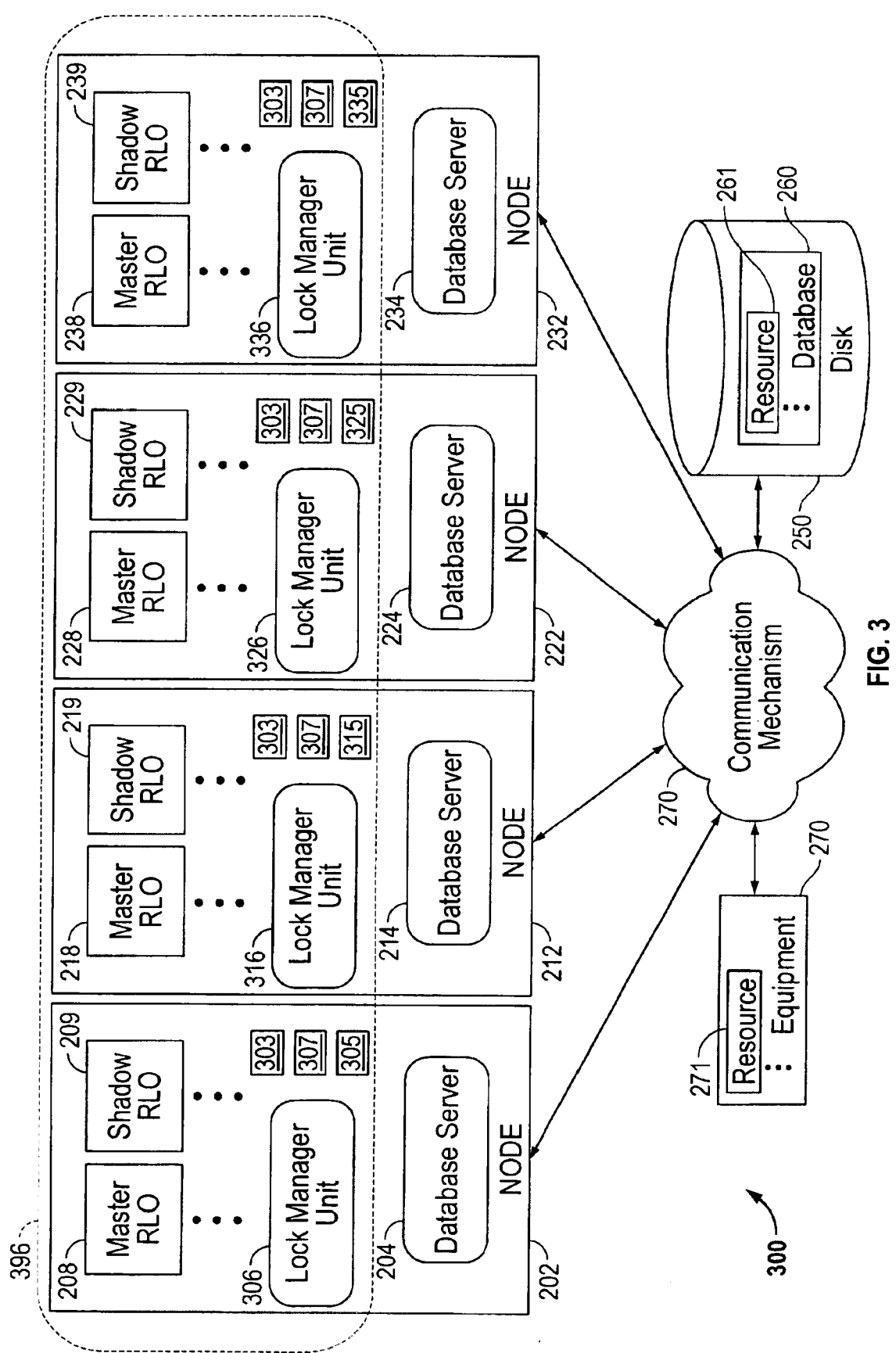
FIG. 3 is a block diagram os a distributed lock manager according to one embodiment of the present invention.

FIG. 3 is a block diagram of a distributed lock management system according to a preferred embodiment of the present invention. Several elements are the same as in the conventional system and hence have the same item numbers as in FIG. 2. The hash map associating constant hash value ranges with replaceable master nodes is stored in a data structure called the hash map 303 according the techniques of U.S. patent application Ser. No. 09/218,864. As shown in FIG. 3, the hash map 303 is replicated on all the active nodes of the cluster. This hash map is used by the modified DLM 396 including the modified lock manager units 306, 316, 326 and 336 on the respective nodes 202, 212, 222 and 232.

Also shown in FIG. 3 are other data structures used in the preferred embodiment of the present invention. These include the master weight table 307, which is also replicated to each of the active nodes in FIG. 3, and an open lock table indicating the number of open locks on open resources associated with each hash value ranged. The open lock table may be a single table with the open locks and active nodes combined and replicated on all the active nodes in the cluster. Alternatively, the open lock table can be a virtual table constructed from separate open lock tables for each node, as shown in the preferred embodiment of FIG. 3. The master weight table 307 and the open lock tables 305, 316, 327 and 336 will be explained in greater detail below.

FIG. 4A depicts one embodiment of a hash map associating hash value ranges with master nodes according to U.S. patent application Ser. No. 09/218,864. In this embodiment of the hash map 303, there are a plurality of rows 401, 402 etc., one row for each hash value range. Each row includes a field 492 for the hash value range and a field 494 for identifying the node that is responsible for mastering resources that are associated with hash values within that hash value range. As can be seen in FIG. 4A, there are many more hash value ranges, i.e., rows, than there are active nodes in the cluster. In the example depicted in FIG. 4A, there are only 4 active nodes that may serve as master nodes, 202, 212, 222 and 232. Consequently, several hash value ranges are associated with the same master node. In this example, hash value range 0–9 in row 401, hash value range 40–49 in row 405, and hash value range 80–89 in row 409 all are mapped to node 202 which serves as master node for resources that hash into any of the three ranges. If N, the maximum number of active nodes allowed in the cluster, were 10, then the number of hash value ranges in the hash map 303 would be an integer multiple of 10, where the integer is a large integer such as 5 or more. If the integer multiple were 5, then the hash map 303 would have 50 hash value ranges listed in 50 rows.

Continuing with this example, each of the 50 rows is associated with a master node—ideally one of the 4 actually active nodes in the cluster. As illustrated in FIG. 4A, one way to make this association is to cycle through the 4 active nodes repeatedly until reaching the end of the hash map in the 50$^{th}$ row. After 12 complete cycles of the 4 active nodes, 48 rows would be filled, and the last 2 rows of the hash map would be associated with nodes 202 and 212, respectively, the next 2 nodes on the next cycle through the 4 active nodes. As a result, rows 222 and 232 would serve as master nodes for 12 ranges each, while master nodes 202 and 212 will serve as master nodes for 13 ranges each. Thus, in this example, by using a large integer multiple of the maximum number N of nodes allowed in a cluster, a relatively even distribution of hash value ranges with the available active nodes is achieved.

FIG. 4B is an alternative arrangement for the hash map, designated in FIG. 4B as hash map 303'. In this embodiment, there is 1 row for each unique master node. In each row, a field identifying the master node is followed by a list of hash value ranges that are associated with that node. The hash mapping achieved by the hash map 303' in FIG. 4B is the same as the hash mapping achieved by the hash map 303 in FIG. 4A, and shows by way of example the first 3 hash value ranges associated with each master node. Note that in both arrangements, because there are many more hash value ranges than there are active nodes serving as master, there are several hash value ranges associated with each master node. In the structure in FIG. 4A, this is reflected by the multiple appearance of each master node; and in FIG. 4B this is illustrated by the multiple hash value ranges associated with each master node. An active node that does not serve as a master would not appear in Table 303, and might not appear in Table 303' or might appear in Table 303' with no hash value ranges.

In summary, the hash map associates one or more hash value ranges with each master node, where a hash value range is a range of hash values produced by a constant hash function. In the example shown, the hash value ranges are approximately evenly distributed among the available nodes. This is not always the most desirable arrangement. The master weight table described next allows the distribution of hash value ranges with master nodes to be flexibly adopted to desirable but uneven distribution of the master nodes.

The Master Weight Table

A master weight table 307 is included in the preferred embodiment of the present invention for controlling the hash mapping of hash value ranges to master nodes to reflect desirable but uneven distributions of mastering responsibilities among the active nodes. There are a variety of circumstances under which the distribution of mastering responsibilities should not be even. For example, different nodes may have different hardware that makes them more or less capable of processing the lock information from any resources. Also, a node may have duties that conflict with its availability for mastering resource locks. For example, a node may be within the cluster purely as a standby node to take on the processes of an important node should that important node go down or otherwise leave the cluster.

According to this embodiment of the present invention, the desirability or capacity of the node to serve as a master node for resource locks is indicated by a weight associated with each node that may ever join the cluster. In this embodiment, the more resources the node can desirably accommodate, the higher the weight. A weight of 0 indicates the node is neutral as to whether it serves as a master node. A negative weight, specifically a weight of −1, indicates that the node should not be used as a master node, for example, when the node is a standby node.

The weights associated with the nodes are defined and maintained in a master weight table 307. An example of a master weight table 307 is shown in FIG. 5. In this example, there is a row for every node which may ever join the cluster. Each row has a field 592 for node identification and a field 594 for the corresponding weight. For example, in row 501 the actually active node 202 has a weight of −1, indicating that node 202 is to serve as a standby node and is not to serve as a master for locks on any resources while the node 202 remains a standby node. In row 502, the active node 212 has a weight of 0, indicating it is neutral as to whether it serves as a master node for resource locks. Furthermore, in row 503 active node 202 has a weight of 2 indicating node 202 may master more resource locks by serving as the master of more hash value ranges than node 212. FIG. 5 also shows that active node 232 is able to perform as master node for more resources than is node 212 but for fewer than is node 222. FIG. 5 also indicates that currently inactive nodes E, F, G and H, which may join the cluster at some future time, have varying abilities to serve as master nodes, in rows 505, 506, 507 and 508, respectively.

In the preferred embodiment, the nodes which are not to serve as master nodes have weights of −1, and the number of hash value ranges to be mastered by each active node is given by Equation 1.

$$h_i = H(W_i + 1) / \left( \sum_{j=1}^{n} (W_j + 1) \right) \quad (1)$$

where $h_k$=the number of hash value ranges to be mastered by node k,
$W_k$=weight of node k among active nodes,
H=total number of hash value ranges to master, and
n=number of active nodes in the cluster.

That is, the number of hash value ranges to master by node i equals (total number of hash value ranges to master) times (weight of node i+1) divided by (the sum over all the active nodes on the cluster of (weight of node+1)).

When the result of Equation 1 is not an integer, the result is converted to an integer, such as the nearest integer, the greatest included integer, or the next greater integer, such that the total number of hash value ranges mastered by all the active node sums to the total number of hash value ranges to be mastered, in any way known in the art.

For example, if there are 50 hash value ranges to master, and there are 4 active nodes listed in rows 501 through 504 of FIG. 5, then the number of hash value ranges to be associated with each of the four active nodes is as follows. Node 202 has a weight of −1 so that the (weight+1) equals 0. Node 212 has a (weight+1) of 1, node 222 in row 503 has a (weight+1) of 3 and node 232 in row 504 has a (weight+1) of 2. The sum of these weights of these active nodes is 0+1+3+2=6. Note that the weights of the inactive nodes E, F, G and H are not included in the computation. Substituting these values into equation 1 yields the following results. Active node 202 serves as master for 0 hash value ranges. Active node 212 serves as master node for 50×1÷6=8⅓ which goes to 8. Actual node 202 serves as master for 50×3÷6=25 hash value ranges. Actual node 232 serves as master for 50×2÷6=16⅔ which goes to 17 hash value ranges. That is, the number of hash value ranges associated with the nodes 202, 212, 222 and 232 are 0, 8, 25 and 17, respectively.

The Open Locks/Resources Table

The weights described above determine the maximum number of hash value ranges that should be associated with each node. However, the weights do not indicate which of the hash value ranges should be associated with each node. That is, in the above example, the weights indicate that 8 hash value ranges should be associated with node 212, but does not indicate which 8 hash value ranges should be mastered at node 212. According to the preferred embodiment of the present invention, a hash value range is associated with a master node based on the number of open locks or open resources owned by each node.

FIG. 6 depicts an open locks/resources table used to determine which nodes master which hash value ranges. In the following discussion, the table in FIG. 6 will be described as if it contains information about the number of resources which have open locks, i.e., as if the table were an open resource table. However, it is understood that the values in the table of FIG. 6 could also refer to the number of open locks on the resources and still provide information about the amount of lock information residing on each node and the amount that would have to be transferred from one node to another to master a hash value range at a different node. In this context, and as used herein, the number of open resources and the number of open locks on the resources are interchangeable measures of the usage of resources and the amount of lock information that must be stored at the master node.

The open resource table in FIG. 6 includes several rows, one row for each hash value range. For example, row 601 has a field 692 indicating the hash value range 0–9. Each row also includes a list of the open resources owned by processes on the various active nodes. For example, row 601 contains a field 694 giving the number of open resources owned by the active node 202. Field 694 indicates that processes running on node 202 own open locks on 10 resources which hash to the hash value range 0–9. Field 696 indicates that node 212 also owns open locks on 10 resources which hash to the hash value range of 0–9. Field 698 indicates that active node 222 owns open locks on no resources which hash to the range 0–9. Similarly, other fields in row 601 not shown would indicate a number of open resources on the other active nodes that hash to the hash value range 0–9. Similarly, as well, the other rows indicate the number of open resources on each active node associated with the other hash value ranges. For example, row 602 provides a number of open resources which hash to values in the range 10–19 for each node.

There are several ways to use the information in an open resource/lock table to determine which node should serve as the master node for a given hash value range. In one embodiment, the instance with the highest open resource count for a hash value range becomes the preferred owner. For example, if node 232 were to leave the cluster and hash value range 30–39 were mastered at node 232, as in the previous examples, then row 604 would be examined to determine which of the remaining nodes should master the hash value range 30–39. In this example, node 202 has more open resources for the hash value range 30–39 than either of nodes 212 and 222. Therefore, node 202 would become the new master node for hash value range 30–39. By virtue of this choice, the information for 100 open resources is already on node 202 and will not have to be transferred between nodes, thus valuable communication channels are not burdened. The number of,messages required to form a master RLO on node 202 would be 12, 10 messages from node 212 and 2 messages from node 222, assuming each message carries all the lock information needed to support each open resource.

When a node is assigned to become a master of the resources associated with a hash value range, the lock information can be transferred with fewer messages if the lock information for several open resources is packed in the same message. In this example, the selection of node 202 to master the hash value range 30–39 is optimal in that it results in fewer messages being transferred between nodes to reconstruct a master RLO.

Each node maintains the counts of open resources and/or open locks in the shadow RLOs that are on the node. These counts can be assembled into an open resource/lock table at the time of re-mapping by sending messages among the nodes. The assembled open resource/lock table used during re-mapping can be maintained either on a single node, such as a name server, or the node with the smallest node id, or can be replicated among all the nodes.

Figure 7A:
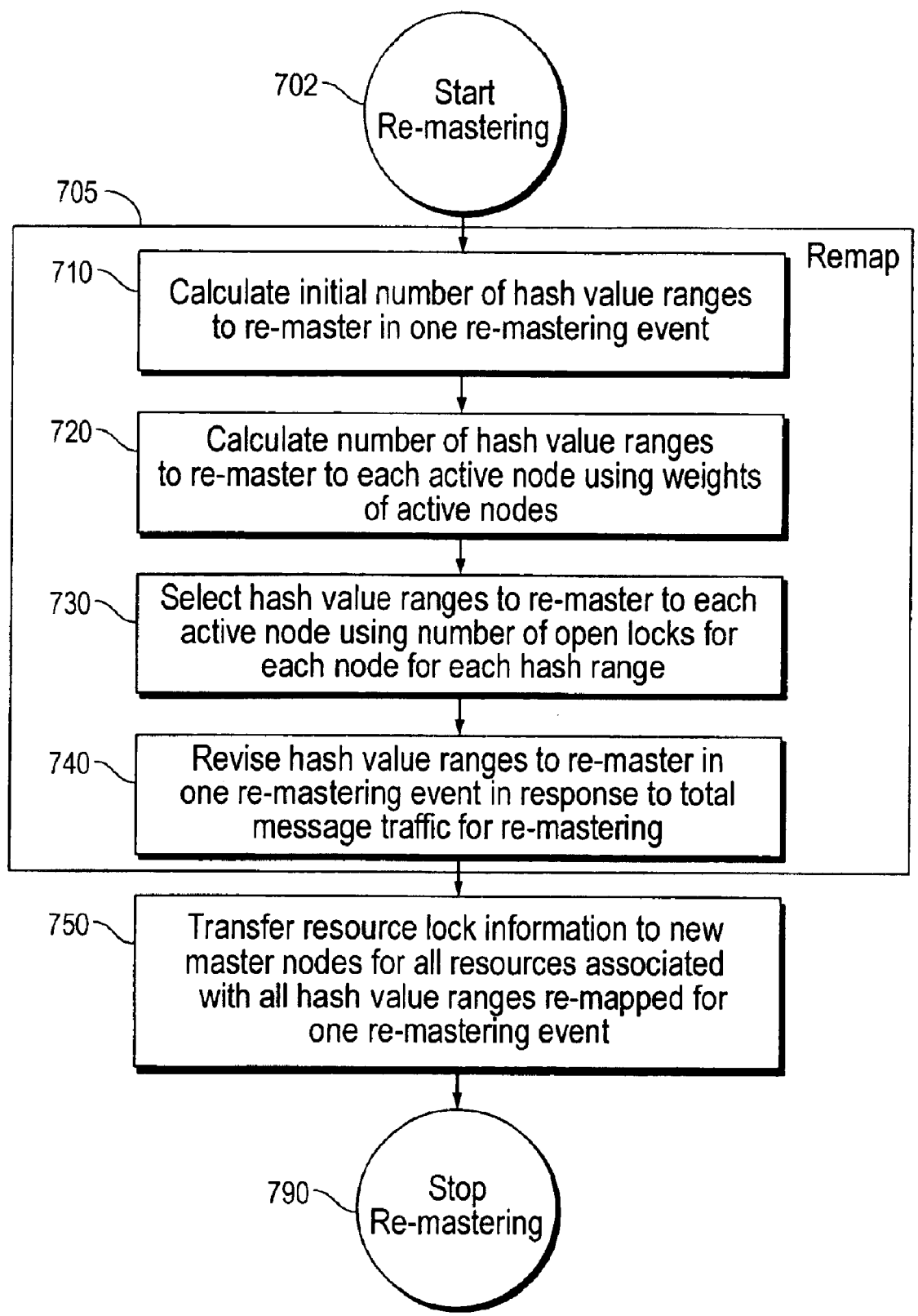
FIG. 7A is a flow diagram of a method for re-mastering a distributed lock manager according to one embodiment of the present invention.

It may not always be possible or desirable to select the node with the largest count of open locks or open resources as the new master node. For example, the node may already have the number of hash value ranges allowed by virtue of its weights. Also, if a node has joined the cluster and the joining node opens the most resources for the hash value range but the current master node for the hash value range is one of the original nodes in the cluster, then the originally defined master node should retain mastership of this hash value range. In another case, when a node joins the cluster, there are circumstances where the new node should serve as a new master even though the count of open locks or resources on the joining node is less than the count on any or all of the other nodes with open resources. These RE-mastering When the system decides, for reasons to be explained in more detail below, that a new master node needs to be defined for one or more hash value rages, then a re-mastering process is begun. FIG. 7A shows a flowchart for the re-mastering method according to one emodiment of the present invention. The method includes both re-mapping step 705 and a trasfer step 750. In the re-map step 705, new master nodes are assigned for each hash value range in the hash map. In step 705, the information is transferred to the new master nodes for all open resorces associated with the hash value ranges re-mapped in step 705. The combination of the re-mapping step 705 and the transferring step 750 constitutes one re-mastering event. Multiple re-mastering events can be utilized to continue to distribute lock information among the available nodes as terminating nodes leave the cluster and joining nodes join the cluster. The circumstance precipitating each re-mastering event are described in more detail later.

Re-mapping

In one embodiment, also depicted in FIG. 7A, the re-mapping is accomplished ina series of steps. In step 710, the system calculates a number of hash value ranges to re-master in onr re-mastering event. This calculation can be based on the state of the master weight table or the state of the open lock/resource table or it can depend on directions received from the DLM system when the re-mastering event in invoked. The circumstances which dictate the number of hash value ranges to re-master will described in mor detail later.

In step 720, the system calculates how many of the hash value ranges that must be re-mastered during this re-mastering event can be associated with each active node using the weights of the active nodes in the master weight table. In step 730, the system selects which hash value ranges to associate with each active node using the counts of open locks or open resources in the open/lock resource table. In an optional step 740, the number of hash value ranges to re-master in this one re-mastering event calculated originally in step 710, is revised. This revision may be necessary to satisfy restrictions imposed by the system on the total number of messages that may be generated in any single re-mastering event. If re-mastering all the hash value ranges calculated in 710, for example, requires more messages than allowed in a re-mastering event, then some hash value ranges will not be re-mastered in the current re-mastering event.

Figure 7B:
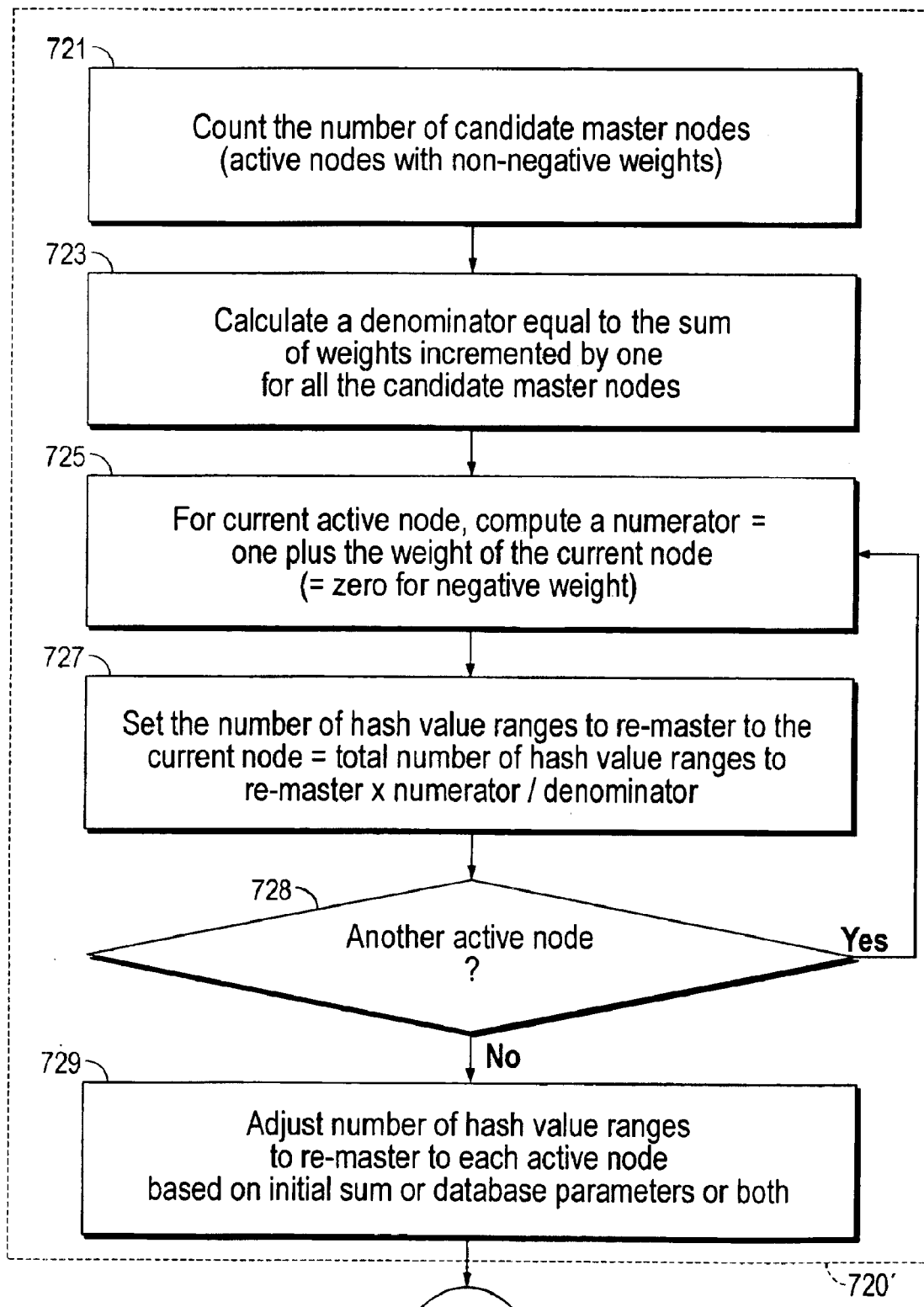
FIG. 7B is a flow diagram for a method to perform step 720 of FIG. 7A according to one embodiment of the present invention.

FIG. 7B is a flow diagram providing more detail on using the master weight table to calculate the number of hash value ranges that each active node may master in step 720 of FIG. 7A according to this embodiment. The number of candidate master nodes is counted in step 721. A candidate master node is an active node in the cluster having a non-negative weight In this embodiment, a negative weight indicates a node which is not to master any hash value ranges, for example, a node that serves as a stand-by node for an important node already in the cluster. In step 723, a denominator is computed which is equal to the sum of the weights incremented by one for all the candidate master nodes. In the example given above, based on the master weight table in FIG. 5 and for candidate master nodes 202, 212, 222 and 232, the sum of weights incremented by one has a value of 6. In step 725, a numerator is calculated for each active node by adding one to the weight of the current active node. The numerator is equal to 0, for example, if the weight of the current node is −1. If the weight of the current active node is less than −1, then the numerator should still be set to 0. In step 727, the number of hash value ranges to re-master to the current node is set equal to the total number of hash value ranges to re-master times the numerator divided by the denominator. In the example given above, the total number of hash value ranges to re-master was 50. Step 727 evaluates equation 1. Using this same example, active node 202 with a weight of −1 will become the master of 0 hash value ranges, while active node 222 will re-master 25 hash value ranges. In step 728, the system determines whether another active node needs to have a number of ranges to master computed. If so, the method loops back through step 725. In an optional step 729, the results of the computation following formula 1, can be adjusted at this stage. In some embodiment, the adjustment made in step 729 includes converting fractional results from equation 1 to integer results that correct the number of hash value ranges to re-master. In other embodiments, the adjustment in step 729 includes moving some hash value ranges from one master node to another to satisfy system parameters that may limit the maximum number to re-master to one node in one re-mastering event. Again note that the adjustments in 729 refer only to the total number of hash value ranges to re-master at each node and does not involve selecting a particular hash value range to associate with a particular active node.

In one embodiment, the total number of hash value ranges, H, used in Equation 1, is the total number of hash value ranges in the hash map. In this case, the number of ranges to re-master is given by the differences between the number previously mastered by each node and the new number to be mastered by each mode. If a new node has joined the cluster, many nodes that are still active in the cluster may lose one or more ranges to the new node or nodes joining the cluster. In an alternative embodiment, the total number of hash value ranges H to re-master is the number of hash value ranges that have had their master nodes leave the cluster. In such an embodiment, the number computed by Equation 1 is the number of ranges that must be re-mastered at each remaining node (in addition to the ranges already mastered there). In this case, no active node gives up a range if a node joins the cluster. Instead, each active node takes on zero or more masterless ranges created when a terminating node leaves the cluster.

Figure 7C:
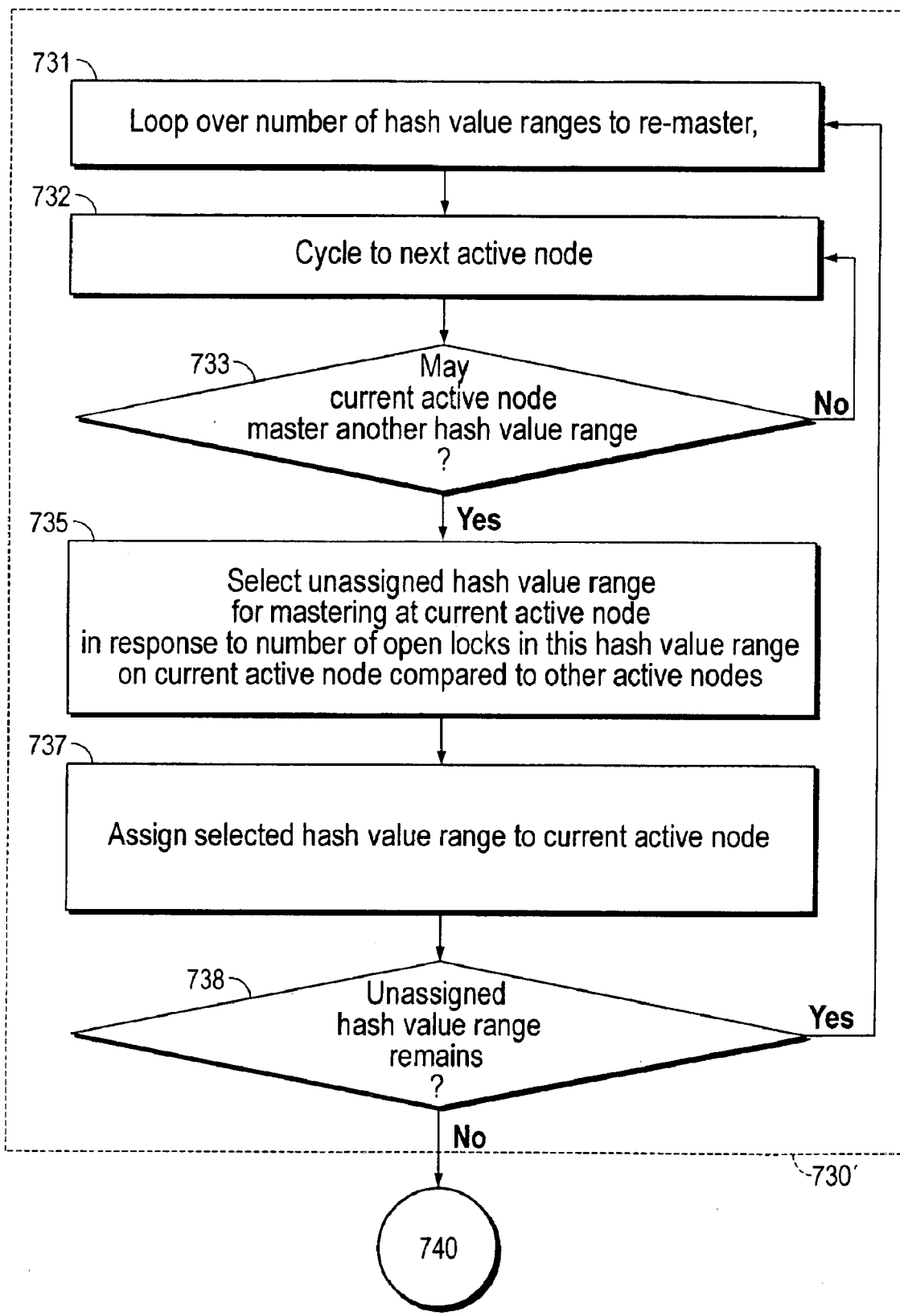
FIG. 7C is a flow diagram for a method to perform step 730 of FIG. 7A according to one embodiment of the present invention.

FIG. 7C is a flow diagram showing details for step 730 in another embodiment of the present invention. This alternative step 730' may be used alone or in conjunction with the embodiment 720' described in FIG. 7B. At the start of step 730', the total number of hash value ranges to be re-mastered is known, and that number is used to establish a loop in step 731. In step 731, not only are the total number of hash value ranges to re-master known, but a list of hash value ranges that need new masters is also known according to this embodiment. In step 732, the next active node is selected. At the beginning, and after the last active node, the next active node would be the first active node. In this way, step 732 cycles from one active node to the next until a condition is satisfied in step 733. In step 733, it is determined whether the current active node can serve as master for another hash value range. In one embodiment, this is done by tracking the total number of hash value ranges that each node can master, as computed in step 720. That value is decremented every time a hash value range is assigned to this node during this step 730'. If this active node has not yet been assigned as master for its maximum number of hash value ranges, then the method goes on to step 735. In step 735, the open lock/resource table is examined to determined the still unassigned hash value range for which the current active node has the highest counts compared to the other active nodes. Of these, this embodiment selects the hash value range for which the current active node has the highest absolute count. If the current active node does not have a higher count than the other active nodes for any of the remaining hash value ranges, then the hash value range for which the active node has a count greater than 0 and the sum of the counts of the remaining active nodes is a minimum. This condition insures that a hash value range is assigned to a master node in a way that minimizes the amount of information that must be transferred to the master node, minimizing the number of messages that will have to be transmitted to accomplish the information transfer.

In step 737 of the FIG. 7C embodiment, a hash value range that has been assigned to a new master node is removed from a list of hash value ranges that need new master nodes assigned. In step 738 the list of hash value ranges that still need master nodes assigned is inspected to see if any hash value ranges remain. If so, the loop is incremented and the control is returned to step 731. If all hash value ranges have master nodes assigned, then step 730' finishes and sends control to step 740.

Figure 7D:
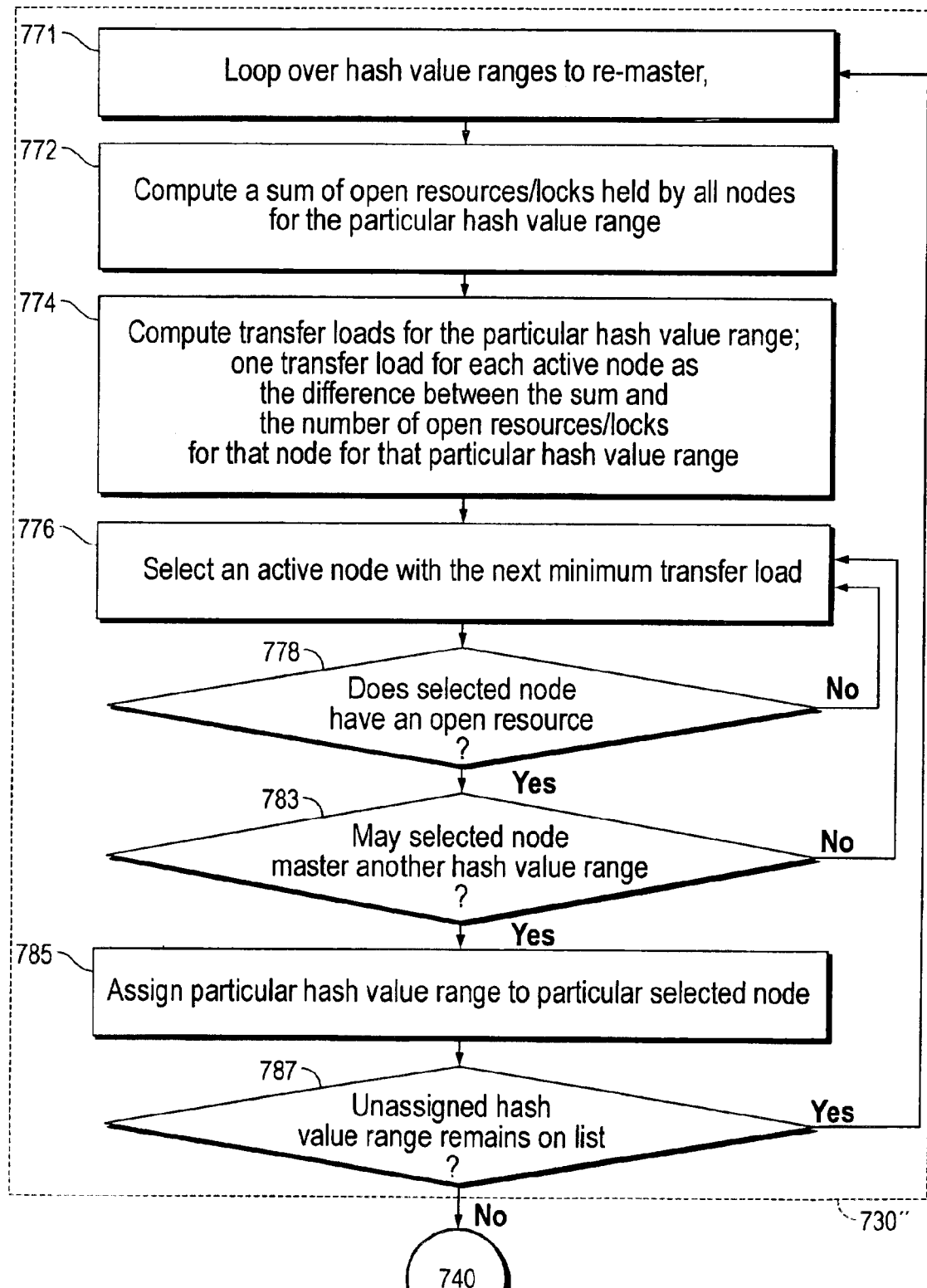
FIG. 7D is a flow diagram for a method to perform step 730 of FIG. 7A according to another embodiment of the present invention.

An alternative embodiment for step 730 is shown in FIG. 7D as step 730". This procedure computes the message traffic required to re-master a given particular hash value range to any of the available nodes. In step 772 a sum is computed of the counts of all the active nodes for the particular hash value range. In step 774, a series of transfer loads is computed, responding to each of the active nodes with open resources or locks on this particular hash value range. The transfer load is dependent on the difference between the sum and the counts at this particular node. That difference reflects the number of open locks or resources that must be transferred to this node from the other nodes. For example, the hash value range in row 604 of FIG. 6 has a count of 100 at node 202, 10 at node 212 and 2 at node 222. The sum of these counts is 112. The transfer load at node 202, i.e., the amount of information that must be transferred to node 202, is related to the difference between the sum 112 and the count at node 202 which count is 100. The difference is 12. The transferred load is related to the number 12. Similarly, the transfer load to make node 212 the master of hash value range 30–39, is related to the difference 102. A difference of 102 is substantially larger than the difference for node 202, indicating much more message traffic is required to make node 212 the master node. The difference at node 222 is greater still, at 110. Thus, a series of transfer loads can be computed for each hash value range and the preferred new master for the new set of master nodes is the node having a minimum transfer load.

In the embodiment of FIG. 7D, the method loops over all hash value ranges selecting a candidate new master node based on minimum transfer load, in step 776. Then the selected node is checked to see if it can master another range in step 7, for example as limited by the weights. In step 778, a node is not selected as master unless it has at least one open resource.

After step 740 in FIG. 7A, re-mapping is complete. In general, re-mapping responds to a set of hash value ranges that need to be re-mastered in the current re-mastering event. The set of hash value ranges that need to be re-mastered in one re-mastering event constitute a replacement range set. The nodes listed as the master nodes for the replacement range set in the hash map before re-mapping constitute an old set of master nodes. The set of master nodes associated with the replacement range set after the re-mapping constitute the new set of master nodes. Note that the new set of master nodes are selected from the active nodes in the cluster. Note also that the same new master node may be assigned to more than one of the ranges in the replacement range set. Similarly, the same old master node may appear more than once in the old set of master nodes associated with the ranges in the replacement range set.

In steps to be described in more detail below, the hash value ranges in the replacement range set are determined depending on the circumstances of the system. For example, the ranges for the replacement range set may be selected from the hash value ranges associated with a terminating master node. In addition or alternatively, the hash value ranges in the replacement range set may be selected from those associated with a master node that has too many hash value ranges assigned to it. Such a master node is an excess master node. A master node may be identified as an excess master node based on whether the proportion of ranges it masters is greater than the proportion allowed according to the master weight table.

Transferring Lock Information to the New Master

Figure 8:
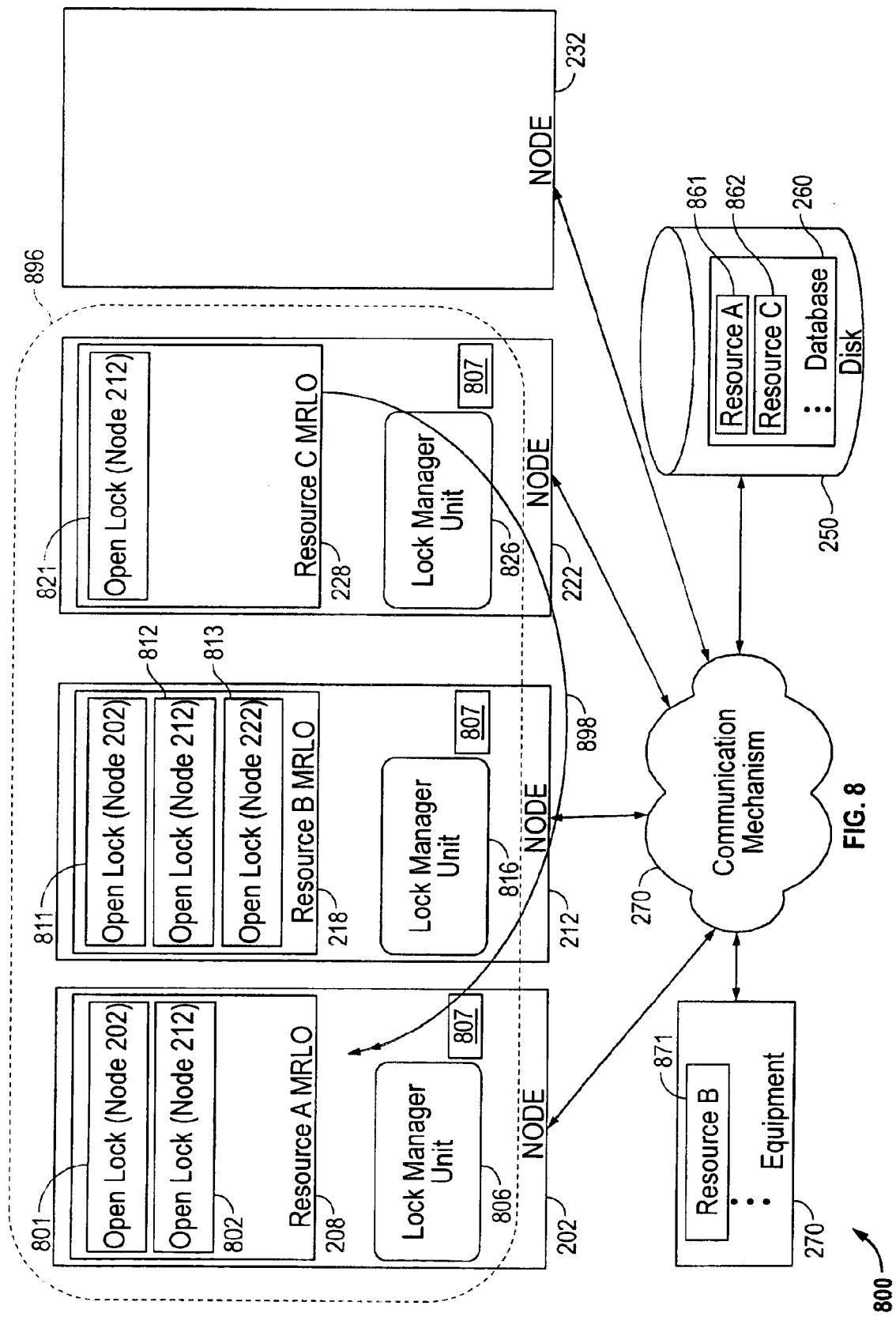
FIG. 8 is a block diagram of a distributed lock manager according to one embodiment of the present invention illustrating a transfer of lock information after re-mastering from an old master node to a new master node.

In another aspect of the present invention, lock information is transferred to the new master in a manner that reduces or eliminates freezing out of lock requests during the transfer. FIG. 8 depicts the transfer of information from one master RLO on node 222 to node 202. In FIG. 8, items identical to those in FIGS. 2 or 3 have identical item numbers. The shadow RLOs are not shown in FIG. 8. FIG. 8 shows 3 resources, resource A and resource C representing data blocks 861 and 862 in database 260, and resource B representing a buffer 871 on equipment 270.

As shown in FIG. 8, resource A is hashed to a range mastered on node 202. Therefore, a resource A master RLO, MRLO 208 resides on node 202. Similarly, resource C is hashed to a range that is mastered on node 222 so a resource C MRLO 228 resides on node 222. Resource B on equipment 270 hashes to a value in a range mastered by node 212. Therefore a resource B MRLO 218 resides on node 212. In the example illustrated in FIG. 8, processes running elsewhere on the active nodes have requested locks on all 3 resources: data block 861, buffer 871, and data block 862. Therefore, all 3 resources are open resources and each has a master RLO on one of the nodes of the system.

According to the example depicted in FIG. 8, processes running on both node 202 and 212, not shown, have requested locks on resource A, data block 861. Thus, resource A MRLO 208 includes 2 open lock objects 801, 802 for processes on node 202, 212, respectively. In this example, processes running on all 3 nodes, not shown, have requested locks on resource B buffer 871. Consequently, resource B MRLO 218 contains 3 open lock objects 811, 812, 813 for the processes on nodes 202, 212, 222, respectively. Similarly, resource C, data block 862 is hashed to a value in a range mastered at node 222. Therefore, a resource C MRLO 228 resides on node 222. In this example, the only open lock object 821 on resource C is owned by node 212. Therefore, one open lock object 821 owned by node 212 is in the resource C and MRLO 228.

According to the example of FIG. 8, after re-mapping, the new hash map 807 has the hash value range that encompasses the hash value of resource C mastered by node 202. Consequently, the resource lock information must be transferred to node 202 as indicated by arrow 898. Such a re-mapping may be dictated by node 222 leaving the cluster of active nodes or node 222 being designated a stand-by for another node.

Figure 9:
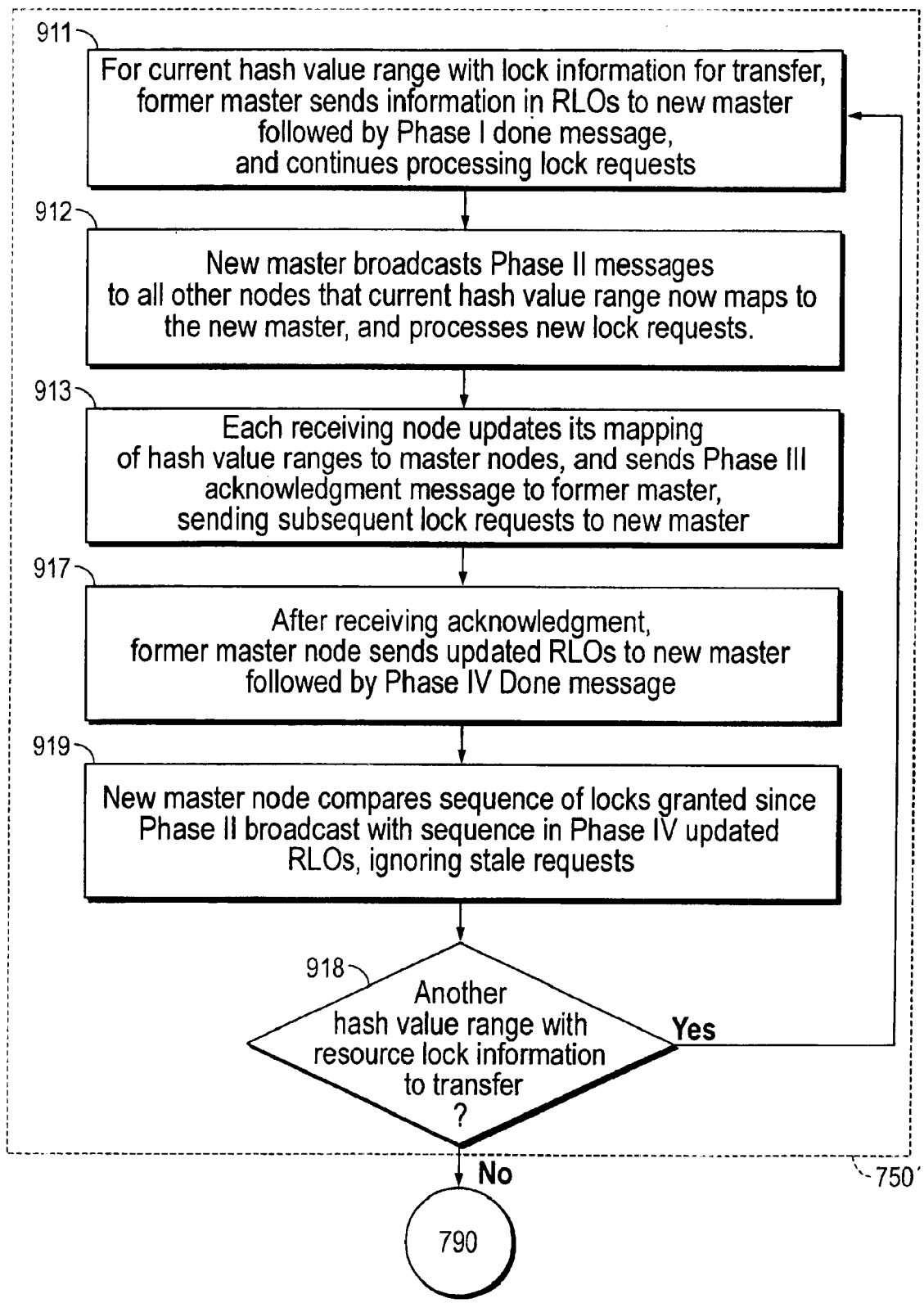
FIG. 9 is a flow diagram of a method for transferring lock information from an old master node to a new master node in step 750 of FIG. 7A according to another aspect of the present invention.

FIG. 9 is a flow diagram of a method for transferring lock information from an old master node to a new master node without completely freezing the processing of locks for resources hashed to the old master node. This method provides details for the step 750 of FIG. 7A.

In step 911, the lock manager unit on the former master node sends information in the resource locking objects to the new master node followed by a phase I done message. Where all terminating nodes, if any, terminate normally, the master RLO is still available on the old master node to send the information to the new master node. Where a terminating node has terminated abnormally, the lock information may come from the shadow RLOs on the remaining active and normally terminating nodes. Because the other nodes are not yet notified of the change in master node, the old master continues processing lock requests for the resources that hash to the hash value range mapped to the old master node. In the preferred embodiment, all lock requests have a sequence number unique to the node of the process making the request, and the RLOs store the sequence number with the open lock objects.

In step 912, after receiving the phase I done message from the old master node, the lock manager unit on the new master node broadcasts a phase II message to all other nodes. The phase II message includes signals indicating that the current hash value range now hash maps to the new master node. The lock manager unit on the new master node begins processing or queuing all new lock requests for the current hash value range that the new master node receives. It processes "open," "downconvert" and "cancel" lock requests. It queues "upconvert" requests until it receives a phase IV done message from the old master, described below, and then it processes the "upconvert" lock requests. The new master node will only receive such requests that originated from processes running on the old master node and any other node that has received the phase HI broadcast message.

In step 913, the other nodes that have received the phase II broadcast message update their hash map so that the current hash value range is now associated with the new master node. The receiving nodes then send a phase III acknowledgement message to the former master. This ensures that the old master node is made aware that the phase III sending nodes will begin sending their lock requests to the new maser. If this is not correct, for example, if the new master node is trying to usurp hash value ranges not authorized by the old master, that circumstance can be detected by the old master by virtue of this phase m message, and the old master can take remedial action. After sending the phase III acknowledgement message to the former master node, the lock manager units on the receiving nodes begin sending subsequent lock requests for resources hashed to the current hash value range to the new master node.

In step 917, the old master node collects the acknowledgement messages from the other nodes. When all nodes have reported acknowledgement to the old master node, the old master node knows to expect no further lock requests for this current hash value range. Therefore, the old master nodes sends the updated master RLO for this hash value range to the new master followed by a phase IV done message. The updated RLO sent to the new master differs from the RLO sent to the new master during phase I by the lock request processed by the old master in the interim. At this point, the old master will not process any lock request for resources that hash to the current hash value range.

In step 919, the new master node compares the updated RLO received in phase IV with the locks granted since the phase II broadcast message. The new master node reconciles the states of the locks. Certain locks processed by the old master were made obsolete by the more recent lock requests handled by the new master, i.e., the requests in the updated RLO are stale. The new master will ignore the stale requests.

The new master can detect stale lock requests in the updated RLO because such a stale lock request will have a sequence number earlier than the sequence number of lock requests handled by the new master node for the same process.

In step 918, the distributed lock manager determines whether any other hash value ranges have been re-mastered such that the master lock information must be transferred to a new master. If there are such ranges, the process repeats for the next set of old and new master nodes. If there are no such hash value ranges remaining to be transferred, the re-mastering event is complete and stops in step 790.

Following this procedure, a node that is responsible for mastering resources can leave the cluster of active nodes without freezing lock requests for either the re-mastered hash value ranges, or re-mastering any of the other hash value ranges. Thus, re-mastering according to the methods of FIG. 9, does not interrupt the database server operation of the database.

Defining a Re-Mastering Event

In the preceding sections, techniques are described for confining re-mastering to a sub-set of hash value ranges called a replacement range set. Also described above was a method of transferring lock information from an old master to a new master without freezing lock requests for resources in the hash value range being re-mastered. In the present section, a method for determining how many hash value ranges are in the replacement range set at any one time interval is described. By this method, the complete re-mastering required is performed over one or more discrete re-mastering events. In a re-mastering event, all the ranges in one replacement range set are re-mastered together.

Figure 10A:
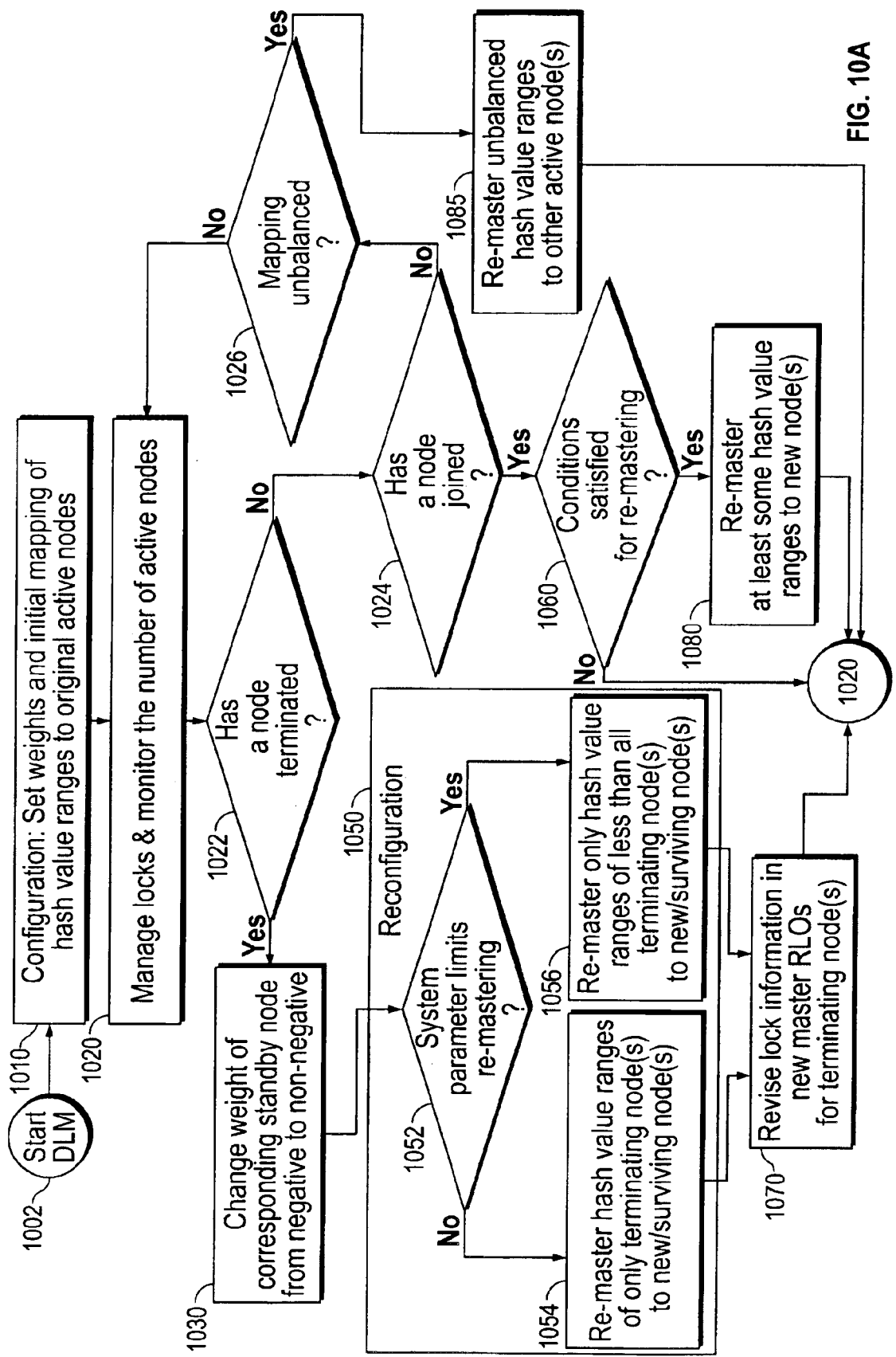
FIG. 10A is a flow diagram of a method to define one re-mastering event for re-mastering a distributed lock manager.

FIG. 10A depicts the process of spreading re-mastering over several re-mastering events according to one embodiment of the present invention. In step 1002, distributed lock management commences. As shown in step 1010, distributed lock management configuration occurs. During such configuration, the distributed lock manager sets weights for any of the nodes that may ever join the cluster. Also, during such configuration, an initial hash mapping is established of all the hash value ranges to the original set of active nodes in the cluster. In step 1020, the DLM 396 performs and processes lock requests, and maintains the master weight table and the hash map and the open resources/locks table.

In the preferred embodiment, the total number of hash value ranges is constant, set during configuration and set to a large integer multiple of the total number of nodes that may ever join the cluster.

For a particular interval of time, the monitoring process identifies whether any terminating nodes leave the cluster, whether any joining nodes join the cluster, and the number of open locks on resources hashed to each hash value range. After each interval of time, re-mastering conditions are checked. If a re-mastering condition is satisfied, then a re-mastering event is performed. The interval of time may be fixed and regular, or it may be a varying time interval ended upon the occurrence of a particular event, or it may be a time interval determined by the processing of a certain sequence of steps and checks. In the following description, various determinations are made after each interval of time, and upon certain combinations of conditions, re-mastering will occur.

In step 1022, DLM 396 determines whether a terminating node is leaving the cluster. If a node is terminating, then control passes to step 1030. In step 1030, a determination is made whether the terminating node has a standby node associated with it. If a standby node is associated with the terminating node, the standby node may have a master weight of negative one (−1), indicating that it is not to serve at the master of any past range unless the node for which it is standby terminates. In this case, the value of the weight in the master weight table should be changed from negative one to zero. In general, it should be changed from a negative value to a non-negative value. Specifically, if it truly serves as a standby node for the terminating node, it should acquire the weight of the terminating node. Thus, if the terminating node had a weight of zero (0), then the standby node's weight should be changed from negative one (−1) to zero (0). If the terminating node had a weight of two (2), then the standby node's weight should be changed from negative one (−1) to two (2). In this way, any subsequent re-mastering will be allowed to reassign some hash value ranges to the standby node. Control then passes to step 1050, reconfiguration.

Reconfiguration, step 1050, refers to a process to accommodate a terminating node in a distributed database, including any re-mastering of resources associated with hash values in hash value ranges formerly assigned to the terminating node. Unlike conventional reconfiguration, the reconfiguration of step 1050 does not redistribute all open resources to all active nodes, but rather, determines an optimal set of replacement hash value ranges to re-map to new master nodes in the next re-mastering event. The optimal re-mastering is a subset of all the hash value ranges, and does not involve a new hashing function. Depending upon system parameters set during configuration or at the start of distributed lock management, reconfiguration in the next re-mastering event may be limited. In the preferred embodiment every hash value range currently mastered by a terminating node is remastered, but other hash ranges are not necessarily remastered. The advantage of limiting the number of hash value ranges that get re-mapped in one re-mastering event is that the amount of time and computer resources involved in re-mastering the locks can be limited, leaving more computer resources to accommodate the other effects of a terminating node. By spreading the re-mastering over several re-mastering events, the delays and performance reductions observed by users of the system are reduced.

In step 1052, the DLM 396 determines whether system parameters have been set that limit how much re-mastering is done at the next re-mastering event. Such limits include the total number of resources that may be transferred in one re-mastering event, the total number of open locks on those resources that can be transferred in one re-mastering event, the total number of messages that may be sent in one re-mastering event, or the work remaining to be performed by subsequent re-mastering events, or any combination of these. If such limits do not restrict the amount of re-mastering that can be performed in the current re-mastering event, either because no such limits were set, or because the limits that were set are greater than the work required to re-master all of the hash value ranges designated to achieve a desired or optimal distribution of hash value ranges, control flows to step 1054. In step 1054 all hash value ranges designated to achieve the desired distribution are re-mastered to the new or surviving nodes or some combination of both. The step 1054 differs from conventional re-mastering during reconfiguration because it does not necessarily involve remastering all resources. Thus, work required by the conventional DLM to move or create lock information for such resources are saved by this embodiment of the invention.

If during step 1052 it is determined that all of the hash value ranges desirably remastered would exceed the parameter limits if re-mastered in this re-mastering event, then all the hash value ranges associated with the terminating node (s) and only some or none of the hash value ranges associated with the non-terminating nodes are re-mastered. Any method can be used to determine which of the hash value ranges of non-terminating nodes will be re-mastered. For example, if the limit is the total number of messages during one re-mastering event, hash value ranges can be selected based on which allow the most different hash value ranges to be re-mastered, so that more processes are allowed to complete their transactions. Alternatively, the method can determine the fewest hash value ranges that require the limited number of messages. In this way, giving preference to re-mastering resources that are most in demand. Other strategies known in the art can be employed to determine which hash value ranges are to be mastered with the limited number of messages.

In step 1070, lock information in the master RLOs are revised to reflect the fact that some nodes are terminating. This requires, at least, that lock requests by processes on the terminating node(s) be deleted, and locks granted to the processes on the terminating node(s) be released to the next lock request in the queue. Other revisions performed during step 1070 will be described later with regard to abnormally terminating nodes. After step 1070, control returns to monitoring locks and active nodes in step 1020.

Figure 10B:
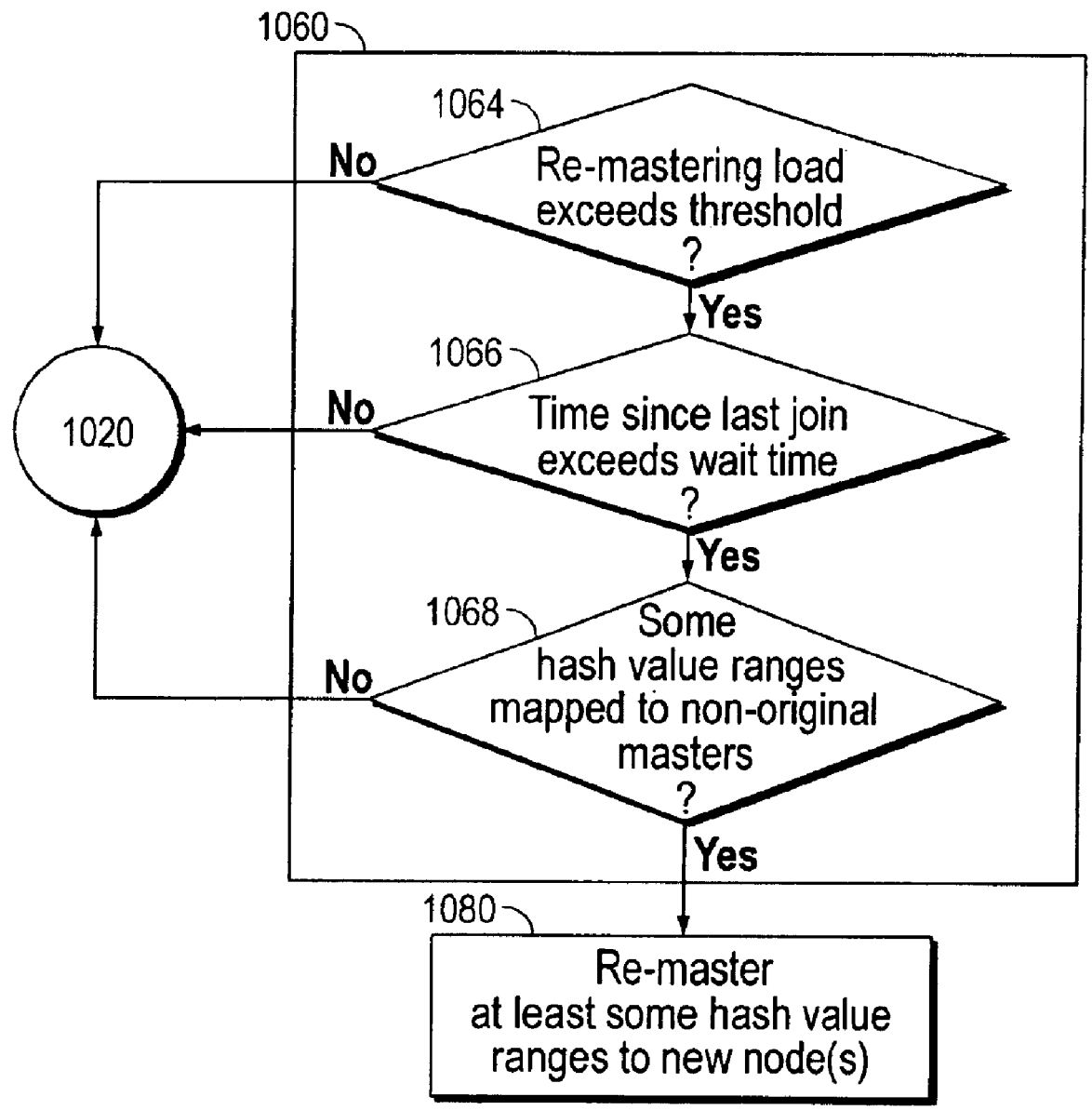
FIG. 10B is a flow diagram for a method to perform step 1060 of FIG. 10A according to one embodiment of the present invention

As described above in step 1022, the DLM 396 determines whether a node has terminated in the last time interval. If no node has terminated, the DLM 396 then determines in step 1024 whether a node has joined the cluster during the most recent time interval. If a node has joined, then re-mastering may or may not occur depending upon the conditions checked in step 1060. In step 1060, conditions are checked to determine whether re-mastering will occur. Several conditions are checked in differing embodiments of the present invention. These conditions in the preferred embodiment are shown in FIG. 10B described later. If the conditions are not satisfied for re-mastering as determined in step 1060, then control returns to step 1020 for subsequent monitoring of the active nodes in managing lock requests. If the conditions checked in step 1060 are satisfied, then at least some hash value ranges are re-mastered to new master nodes in step 1080. After step 1080, control returns to step 1020.

FIG. 10B illustrates conditions that are checked in the preferred embodiment before re-mastering, based on a node joining the cluster in step 1060. These conditions may also be checked in determining whether to involve new joining nodes during re-mastering in steps 1054 and 1056 performed during reconfiguration, step 1050. In step 1064, a re-mastering load is computed that measures computational load, such as message traffic, involved in re-mastering hash value ranges from currently active nodes to the joining node. Since re-mastering involves some overhead or fixed computational costs, it is likely to be unproductive to re-master too frequently. Step 1064 ensures that a sufficient number of locks are re-mastered to dilute the overhead or fixed costs. If the re-mastering load does not exceed some threshold level that makes re-mastering economical, then re-mastering is not performed; that is, conditions for a re-mastering event are not satisfied, and flow returns to step 1020.

In step 1066, the DLM 396 determines whether some minimum wait time has been exceeded since the last node joined the cluster. A benefit of this test is that when the cluster is in a transitional state, such as when several nodes are joining the cluster during start-up, a re-mastering event is not performed at one time interval only having to be repeated and locks redistributed in the next time interval. This test ensures that the cluster stabilizes to a set of nodes that are likely to persist before performing the re-mastering and investing the re-mastering overhead costs in a re-mastering event. Thus, if there has not been sufficient wait time since the last node joined, a re-mastering event does not occur and control is returned to step 1020, that is, the re-mastering event condition is not satisfied.

In step 1068, the DLM 396 determines whether some hash value ranges are currently mapped to masters that are not their original masters. This check is made because there is a preference to leave hash value ranges mastered by their original master nodes. Thus, barring the original master node leaving the cluster, these hash value ranges are left with their original master nodes. We reached step 1060 only when a node joins the cluster. Thus, even if the other conditions are met, there will be no hash value ranges to re-master to the new joining node, unless, at least some of the hash value ranges are currently mapped to non-original master nodes. If the conditions of step 1068 are not satisfied, the control flows to step 1020. That is, the conditions for re-mastering events are not satisfied.

If control has not been transferred to step 1020 by any of these above tests, then the conditions for re-mastering event are satisfied and re-mastering is performed for those hash value ranges not mapped to original master nodes in step 1080. Although 1060 is described above in terms of all conditions 1064, 1066 and 1068, it is anticipated that any or all of these steps can be eliminated in other embodiments of the present invention.

Referring again to FIG. 10A, while checking for conditions for a re-mastering event, the DLM 396 may find that no node has terminated nor has a node joined the cluster during the most recent time interval. In this case, control passes to step 1026 in which it is determined whether the hash mapping is unbalanced. An unbalanced hash mapping is one that deviates by more than a threshold amount from an ideal hash mapping. The ideal hash mapping is determined from all of the current active nodes in the cluster and all the hash value ranges determined at configuration using the weights in the master weight table. The hash mapping is unbalanced if the number of hash value ranges mapped to each master node deviates too much from the number determined using Equation 1. For example, if there are 50 hash value ranges as in the above examples, with node 222 ideally serving as master for 25 of those hash value ranges, and if, as a consequence of nodes joining and terminating from the cluster, the distribution is such that only 10 of the hash value ranges are mastered by node 222, then even though no nodes may have joined or left the cluster during the last time interval, the hash mapping is considered unbalanced. Such imbalance may occur when not all the designated hash value ranges are re-mastered in a previous re-mastering event. Recall that this occurred in step 1056 when system parameters limited the re-mastering performed during reconfiguration, step 1050. If the hash mapping in step 1026 is determined to be balanced, control returns to step 1020. However, if the hash mapping is unbalanced, control passes to step 1085. In step 1085, hash value ranges on nodes bearing more than the ideal number of hash value ranges are re-mastered to other nodes mastering too few hash value ranges. If system parameters limit the amount of re-mastering that can be done in any one re-mastering event, those limits are imposed within step 1085 as shown in step 1050 by step 1052. After the re-mastering allowed within one re-mastering event is completed, control returns to step 1020.

Abnormal Terminations

Many of the steps in the above methods may be performed even in the face of abnormal terminations. If the abnormally terminating nodes does not have open locks on any of the open resources, then all of the information required to continue managing requesting locks are available in the master RLOs and shadow RLOs residing on the remaining nodes. In that case, re-mastering can occur as depicted in FIGS. 7A, 9 and 10A. However, if the abnormally terminating node held open locks for some open resources, then that resource may be dubious. For example, the terminating node might have been in the middle of an update process on a row in a table. This case calls for some special processing.

Figure 10C:
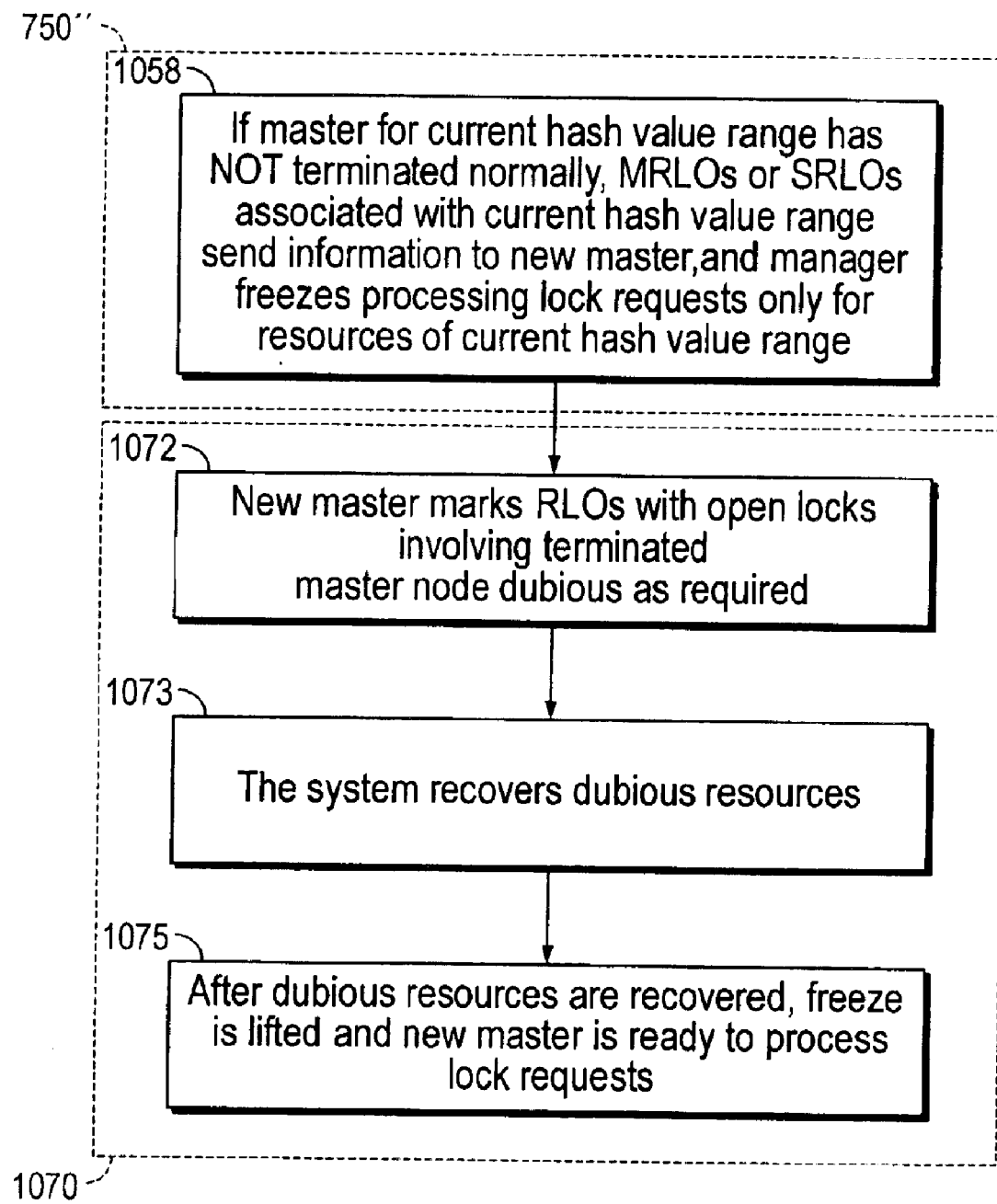
FIG. 10C is a flow diagram of a method for re-mastering with abnormally terminating nodes according to another aspect of the present invention.

FIG. 10C depicts a method for handling re-mastering in the presence of an abnormally terminating node. In step 1058, the master for a particular current hash value range has terminated abnormally. A new master can be assigned using the methods described above. However, the non-frozen transfer of lock information allowed according to the method of FIG. 9 can not be performed reliably because the terminating node is probably not available to process lock requests in the interim before the other nodes acknowledge the new master. Thus, in step 1058, lock requests are frozen for resources hashed to a value in the hash value range mastered by the abnormally terminating node. A benefit remains according to this embodiment, however, because the resources that hash to values in other hash value ranges mastered on the other nodes need not be, and are not, frozen. Step 1058 represents an additional step for step 750 from FIG. 7A in this embodiment.

As indicated above, step 1070 in FIG. 10A must perform additional steps in the case of an abnormally terminating node. In step 1072, the new master marks the RLOs with open locks involving abnormally terminating master node dubious, as required. Not all open locks need to be marked dubious. For example, a read involving the abnormally terminating node does not render the resource dubious. In step 1073, the database server recovers the resources marked dubious using the recovery and recovery lock assets available to the system according to means already known in the art. In step 1075, the DLM 396 receives notice that the dubious resources have been recovered and lifts the freeze on lock requests for the particular hash value range formally mastered by the abnormally terminating node. At this stage, the new master node is ready and able to process all lock requests for this particular hash value range.

Conclusion

Techniques are described above for re-mastering resource locks in a preferred embodiment of a new distributed lock manager DLM 396. The techniques include re-mapping using a master weight table and an open locks/resources table. The techniques also include transferring lock information to a new master without freezing lock requests. The techniques also include continual re-mastering in a series of limited scope re-mastering events, and handling abnormally terminating nodes.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for re-distributing, over a cluster of one or more active nodes, management of locks on shared resources, the method comprising:

establishing a first master node as master for one or more resources in response to a hash value range being mapped to said first master node, wherein the hash value range is associated with said one or more resources by a hash function;

transferring responsibility for mastering said one or more resources from the first master node to a second master node during a transfer time interval;

during the transfer time interval, a receiving node receiving new lock requests, wherein said receiving node is one of the first master node and the second master node;

during the transfer time interval, processing the new lock requests;

re-mapping the hash value range to the second master node at the first master node; and sending initial lock information resident on the first master node at a start of the transfer time interval to the second master node;

wherein transfer of locks from the first master node to the second master node begins at a first point in time;

wherein the transfer of locks from the first master node to the second master node ends at a second point in time;

wherein the transfer time interval begins at the first point in time and ends at the second point in time; and wherein other active nodes in the cluster acknowledge that said other active nodes have been informed that said second master node is assuming responsibility for mastering said one or more resources.

2. The method of claim 1, said transferring further comprising, in response to receiving acknowledgements from all active nodes in the cluster by a full acknowledgement time, sending updated lock information resident on the first master node at said full acknowledgment time to the second master node, wherein the transfer time interval ends at an update time of said sending updated lock information.

3. A computer-readable medium carrying one or more sequences of instructions which, when executed by one or more processors, causes the one or more processors to perform the method recited in claim 2.

4. The method of claim 1, said transferring further comprising:

receiving initial lock information at the second master node, said initial lock information resident on the first master node at a start of the transfer time interval;

re-mapping the hash value range to the second master node at the second master node; and sending a broadcast message to all other nodes in the cluster that the second master node is a new master node for resources associated with the hash value range.

5. The method of claim 4, said transferring further comprising receiving updated lock information from the first master node at the second master node wherein the transfer time interval ends at an update time of said receiving updated lock information.

6. The method of claim 5, wherein:

lock requests include a sequence number; and said method further comprises deleting stale request among the updated lock information received at the second master node, the stale requests indicated by sequence numbers earlier than sequence numbers in lock requests already processed on the second master node.

7. A computer-readable medium carrying one or more sequences of instructions which, when executed by one or more processors, causes the one or more processors to perform the method recited in claim 6.

8. A computer-readable medium carrying one or more sequences of instructions which, when executed by one or more processors, causes the one or more processors to perform the method recited in claim 5.

9. A computer-readable medium carrying one or more sequences of instructions which, when executed by one or more processors, causes the one or more processors to perform the method recited in claim 4.

10. A computer-readable medium carrying one or more sequences of instructions which, when executed by one or more processors, causes the one or more processors to perform the method recited in claim 1.

11. A method for re-distributing, over a cluster of one or more active nodes, management of locks on shared resources, the method comprising:
 establishing a first master node as master for one or more resources in response to a hash value range being mapped to said first master node, wherein the hash value range is associated with said one or more resources by a hash function;
 transferring responsibility for mastering said one or more resources from the first master node to a second master node during a transfer time interval; and
 processing lock requests received at a receiving node of the first master node and the second master node by the receiving node during the transfer time interval, said transferring further comprising:
 receiving a broadcast message at a set of nodes in the cluster, the set of nodes including all nodes in the cluster except the first master node and the second master node;
 wherein the broadcast message indicates that the second master node is a new master node for resources associated with the hash value range;
 re-mapping the hash value range to the second master node at each node in said set of nodes in the cluster;
 sending an acknowledgment to the first master node from each node in said set of nodes in response to the broadcast message, said acknowledgement indicating that said each node in said set of nodes has been informed that said second master node is assuming responsibility for mastering said one or more resources; and
 after sending the acknowledgement, said each node in said set of nodes sending subsequent lock requests for resources associated with the hash value range to the second master node.

12. A computer-readable medium carrying one or more sequences of instructions which, when executed by one or more processors, causes the one or more processors to perform the method recited in claim 11.

13. A computer-readable medium bearing instructions for re-distributing, over a cluster of one or more active nodes, management of locks on shared resources from a first master node to a second master node during a transfer time interval, the instructions arranged to cause one or more processors on the first master node to perform:
 re-mapping a hash value range initially assigned to the first master node to the second master node, wherein the hash value range is associated with one or more of the shared resources by a hash function;
 sending initial lock information resident on the first master node at a start of the transfer time interval to the second master node;
 receiving acknowledgments at the first master node from other active nodes in the cluster; said acknowledgements indicating that said other active nodes have been informed that said second master node is assuming responsibility for mastering said one or more resources.

14. The computer-readable medium of claim 13, said instructions further causing the one or more processors to perform, in response to receiving acknowledgements from all active nodes in the cluster by a full acknowledgement time, sending updated lock information resident on the first master node at said full acknowledgment time to the second master node, wherein the transfer time interval ends at an update time of said sending updated lock information.

15. The computer-readable medium of claim 13, said instructions further causing the one or more processors to perform processing lock requests received during the transfer time interval until receiving acknowledgements from all active nodes in the cluster.

16. A computer-readable medium bearing instructions for re-distributing, over a cluster of one or more active nodes, management of locks on shared resources from a first master node to a second master node during a transfer time interval, the instructions arranged to cause one or more processors on the second master node to perform:
 receiving initial lock information resident on the first master node at a start of the transfer time interval;
 re-mapping a hash value range initially assigned to the first master node to the second master node, wherein the hash value range is associated with one or more of the shared resources by a hash function; and
 sending a broadcast message to all other nodes in the cluster that the second master node is a new master node for resources associated with the hash value range;
 wherein other active nodes in the cluster acknowledge that said other active nodes have been informed that said second master node is assuming responsibility for mastering said one or more resources.

17. The computer-readable medium of claim 16, said instructions further causing the one or more processors to perform receiving updated lock information from the first master node wherein the transfer time interval ends at an update time of said receiving updated lock information.

18. The computer-readable medium of claim 17, wherein: lock requests include a sequence number; and
 said instructions further cause the one or more processors to perform deleting stale requests among the updated lock information received at the second master node, the stale requests indicated by sequence numbers earlier than sequence numbers in lock requests already processed on the second master node.

19. A computer-readable medium bearing instructions for re-distributing, over a cluster of one or more active nodes, management of locks on shared resources from a first master node to a second master node during a transfer time interval, the instructions arranged to cause one or more processors on a third node to perform:
 receiving a broadcast message indicating that the second master node is a new master node for resources associated with a hash value range, wherein the hash value range is associated with one or more of the shared sources by a hash function;
 re-mapping the hash value range to the second master node;

sending an acknowledgment to the first master node in response to the broadcast message, said acknowledgement indicating that said third node has been informed that said second master node is assuming responsibility for mastering said one or more resources; and after said sending an acknowledgment, sending subsequent lock requests for the one or more of the shared resources to the second master node.

* * * * *